United States Patent
Sherman et al.

(10) Patent No.: US 9,285,531 B2
(45) Date of Patent: Mar. 15, 2016

(54) LIGHTGUIDE HAVING A VISCOELASTIC LAYER FOR MANAGING LIGHT

(75) Inventors: Audrey A. Sherman, St. Paul, MN (US); Michael A. Meis, Stillwater, MN (US); Marie A. Boulos, West St. Paul, MN (US); Kevin R. Schaffer, Woodbury, MN (US); Wendi J. Winkler, Minnepolis, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 352 days.

(21) Appl. No.: 13/057,498

(22) PCT Filed: Jul. 30, 2009

(86) PCT No.: PCT/US2009/052198
§ 371 (c)(1),
(2), (4) Date: Feb. 4, 2011

(87) PCT Pub. No.: WO2010/017087
PCT Pub. Date: Feb. 11, 2010

(65) Prior Publication Data
US 2011/0134623 A1 Jun. 9, 2011

Related U.S. Application Data

(60) Provisional application No. 61/114,849, filed on Nov. 14, 2008, provisional application No. 61/087,387, filed on Aug. 8, 2008.

(51) Int. Cl.
*G02B 6/00* (2006.01)
*F21V 8/00* (2006.01)

(52) U.S. Cl.
CPC .............. *G02B 6/005* (2013.01); *G02B 6/0038* (2013.01); *G02B 6/0095* (2013.01)

(58) Field of Classification Search
CPC ..... G02B 6/005; G02B 6/0038; G02B 6/0095
USPC ........................................... 362/618
See application file for complete search history.

(56) References Cited

U.S. PATENT DOCUMENTS 2,440,584 A 4/1948 Heltzer
2,736,721 A 2/1956 Dexter
(Continued)

FOREIGN PATENT DOCUMENTS

CA 1038135 9/1978
CA 2284113 4/2000
(Continued)

OTHER PUBLICATIONS

3M Light Management Films Product Bulletin 3635, 2002, pp. 1-5.
(Continued)

*Primary Examiner* — Thomas M Sember
(74) *Attorney, Agent, or Firm* — Daniel J. Iden

(57) ABSTRACT

Disclosed herein is an optical device including a light source and an optical article. The optical article includes a lightguide and a viscoelastic layer disposed on the lightguide. Light emitted by the light source enters the lightguide and is transported within the lightguide by total internal reflection. The viscoelastic layer manages light, for example, at least about 50%, or less than about 10%, of light that enters the lightguide may be extracted. The optical device can be used in a variety of constructions for signs, markings, display devices, keypad assemblies, tail light assemblies and illumination devices.

29 Claims, 18 Drawing Sheets

(56) References Cited

U.S. PATENT DOCUMENTS

| | | |
|---|---|---|
| 3,718,712 A | 2/1973 | Tushaus |
| 4,082,426 A | 4/1978 | Brown |
| 4,310,509 A | 1/1982 | Berglund et al. |
| 4,418,110 A | 11/1983 | May |
| 4,452,845 A | 6/1984 | Lloyd et al. |
| RE31,886 E | 5/1985 | Hodgson |
| RE31,887 E | 5/1985 | Hodgson |
| 4,542,012 A | 9/1985 | Dell |
| 4,554,324 A | 11/1985 | Husman |
| 4,584,192 A | 4/1986 | Dell et al. |
| 4,737,559 A | 4/1988 | Kellen |
| 4,808,471 A | 2/1989 | Grunzinger |
| 4,874,228 A | 10/1989 | Aho et al. |
| 4,929,866 A | 5/1990 | Murata et al. |
| 4,935,665 A | 6/1990 | Murata |
| 5,054,885 A | 10/1991 | Melby |
| 5,064,272 A | 11/1991 | Bailey |
| 5,066,098 A | 11/1991 | Kult |
| 5,136,483 A | 8/1992 | Schöniger et al. |
| 5,214,119 A | 5/1993 | Leir |
| 5,369,155 A | 11/1994 | Asmus |
| 5,450,235 A | 9/1995 | Smith |
| 5,461,134 A | 10/1995 | Leir et al. |
| 5,471,371 A | 11/1995 | Koppolu et al. |
| 5,506,279 A | 4/1996 | Babu |
| 5,510,171 A | 4/1996 | Faykish |
| 5,633,010 A | 5/1997 | Chen |
| 5,707,130 A | 1/1998 | Zwick et al. |
| 5,738,642 A | 4/1998 | Heinecke et al. |
| 5,750,134 A | 5/1998 | Scholz et al. |
| 5,765,940 A | 6/1998 | Levy et al. |
| 5,784,197 A | 7/1998 | Frey |
| 5,803,086 A | 9/1998 | Scholz et al. |
| 5,825,543 A | 10/1998 | Ouderkirk |
| 5,828,488 A | 10/1998 | Ouderkirk |
| 5,867,316 A | 2/1999 | Carlson |
| 5,882,774 A | 3/1999 | Jonza |
| 5,905,826 A | 5/1999 | Benson, Jr. |
| 5,979,450 A | 11/1999 | Baker et al. |
| 5,985,395 A | 11/1999 | Comstock et al. |
| 6,033,604 A | 3/2000 | Lundin |
| 6,036,340 A | 3/2000 | Fohl et al. |
| 6,049,649 A | 4/2000 | Arai |
| 6,060,157 A | 5/2000 | LaPerre |
| 6,083,856 A | 7/2000 | Joseph |
| 6,095,672 A | 8/2000 | Beninga et al. |
| 6,096,066 A | 8/2000 | Chen |
| 6,102,559 A | 8/2000 | Nold |
| 6,111,696 A | 8/2000 | Allen |
| 6,166,523 A | 12/2000 | Araki |
| 6,179,948 B1 | 1/2001 | Merrill |
| 6,196,704 B1 | 3/2001 | Gauch et al. |
| 6,216,699 B1 | 4/2001 | Cox et al. |
| 6,280,480 B1 | 8/2001 | Tuttle et al. |
| 6,280,822 B1 | 8/2001 | Smith |
| 6,286,984 B1 | 9/2001 | Berg |
| 6,288,172 B1 | 9/2001 | Goetz |
| 6,288,842 B1 | 9/2001 | Florczak |
| 6,314,226 B1 | 11/2001 | Nath |
| 6,332,701 B1 | 12/2001 | Yamada et al. |
| 6,352,359 B1 | 3/2002 | Shie et al. |
| 6,352,761 B1 | 3/2002 | Hebrink |
| 6,367,941 B2 | 4/2002 | Lea et al. |
| 6,367,950 B1 | 4/2002 | Yamada et al. |
| 6,368,699 B1 | 4/2002 | Gilbert |
| 6,379,016 B1 | 4/2002 | Boyd et al. |
| 6,473,554 B1 | 10/2002 | Pelka et al. |
| 6,483,976 B2 | 11/2002 | Shie et al. |
| 6,499,870 B1 | 12/2002 | Zwick et al. |
| 6,523,976 B1 | 2/2003 | Turnbull et al. |
| 6,530,683 B1 | 3/2003 | Ohkohdo et al. |
| 6,568,822 B2 | 5/2003 | Boyd et al. |
| 6,569,521 B1 | 5/2003 | Sheridan |
| 6,582,103 B1 | 6/2003 | Popovich et al. |
| 6,595,671 B2 | 7/2003 | Lefebvre et al. |
| 6,647,199 B1 | 11/2003 | Pelka et al. |
| 6,663,978 B1 | 12/2003 | Olson |
| 6,672,746 B2 | 1/2004 | Amano |
| 6,722,777 B2 | 4/2004 | Erber |
| 6,773,154 B2 | 8/2004 | Desai |
| 6,793,372 B2 | 9/2004 | Wehner et al. |
| 6,795,244 B2 * | 9/2004 | Jagt et al. .................. 359/489.13 |
| 6,796,695 B2 | 9/2004 | Natsume |
| 6,799,880 B2 | 10/2004 | Gozum |
| 6,824,299 B2 | 11/2004 | Mohri et al. |
| 6,827,886 B2 | 12/2004 | Neavin |
| 6,845,212 B2 | 1/2005 | Gardiner et al. |
| 6,848,820 B2 | 2/2005 | Natsume |
| 6,851,839 B2 | 2/2005 | Malone et al. |
| 6,851,843 B2 | 2/2005 | Müller et al. |
| 6,855,386 B1 | 2/2005 | Daniels et al. |
| 6,891,530 B2 | 5/2005 | Umemoto et al. |
| 6,897,771 B1 | 5/2005 | Lodhie et al. |
| 6,927,900 B2 | 8/2005 | Liu |
| 6,939,296 B2 | 9/2005 | Ewers et al. |
| 6,939,936 B2 | 9/2005 | Wang et al. |
| 6,957,903 B2 | 10/2005 | Arakawa et al. |
| 6,972,813 B1 | 12/2005 | Toyooka |
| 6,991,695 B2 | 1/2006 | Tait |
| 6,994,461 B2 | 2/2006 | Lodhie |
| 7,005,394 B1 | 2/2006 | Ylitalo |
| 7,018,061 B2 | 3/2006 | Chen |
| 7,029,152 B1 | 4/2006 | Kuhl |
| 7,030,203 B2 | 4/2006 | Mosbey et al. |
| 7,046,318 B2 | 5/2006 | Yu et al. |
| 7,046,905 B1 | 5/2006 | Gardiner |
| 7,052,166 B2 | 5/2006 | Tessnow |
| 7,059,755 B2 | 6/2006 | Yatsuda et al. |
| 7,072,096 B2 | 7/2006 | Holman et al. |
| 7,078,093 B2 | 7/2006 | Sheridan |
| 7,086,765 B2 | 8/2006 | Wehner |
| 7,090,922 B2 | 8/2006 | Zhou |
| 7,111,969 B2 | 9/2006 | Bottesch et al. |
| 7,116,485 B2 | 10/2006 | Po-Hung et al. |
| 7,128,452 B2 | 10/2006 | Tsai |
| 7,134,768 B2 | 11/2006 | Suzuki |
| 7,137,718 B2 | 11/2006 | Egashira |
| 7,140,741 B2 | 11/2006 | Fleming |
| 7,152,985 B2 | 12/2006 | Benitez et al. |
| 7,160,010 B1 | 1/2007 | Chinniah et al. |
| 7,165,959 B2 | 1/2007 | Humlicek et al. |
| 7,166,686 B2 | 1/2007 | Olson |
| 7,182,494 B2 | 2/2007 | Nakayama et al. |
| 7,204,628 B2 | 4/2007 | Ishida |
| 7,224,529 B2 | 5/2007 | King et al. |
| 7,232,247 B2 | 6/2007 | Yatsuda et al. |
| 7,241,019 B1 | 7/2007 | Tsai et al. |
| 7,241,036 B2 | 7/2007 | Miyagawa et al. |
| 7,249,874 B2 | 7/2007 | Kuhl |
| 7,253,809 B2 * | 8/2007 | Boyd et al. .................. 345/176 |
| 7,255,920 B2 | 8/2007 | Everaerts |
| 7,270,455 B2 | 9/2007 | Befelein |
| 7,275,839 B2 | 10/2007 | Coushaine et al. |
| 7,290,906 B2 | 11/2007 | Suzuki et al. |
| 7,315,418 B2 | 1/2008 | DiZio |
| 7,318,663 B2 | 1/2008 | Verbrugh et al. |
| 7,322,725 B2 | 1/2008 | Worakasemsuk et al. |
| 7,326,448 B2 | 2/2008 | Jones et al. |
| 7,336,422 B2 | 2/2008 | Dunn |
| 7,341,364 B2 | 3/2008 | Yamaguchi et al. |
| 7,344,284 B2 | 3/2008 | Lynam et al. |
| 7,347,600 B2 | 3/2008 | Albou |
| 7,347,601 B2 | 3/2008 | Mizushima |
| 7,361,474 B2 | 4/2008 | Siegler |
| 7,402,722 B2 | 7/2008 | Hill et al. |
| 7,453,636 B2 | 11/2008 | Yeo et al. |
| 7,481,563 B2 | 1/2009 | David et al. |
| 7,498,535 B2 | 3/2009 | Blake |
| 7,695,180 B2 | 4/2010 | Schardt et al. |
| 7,905,650 B2 * | 3/2011 | Ma et al. .................. 362/615 |
| 7,995,278 B2 | 8/2011 | Endle |
| 8,346,048 B2 | 1/2013 | Bita et al. |
| 2003/0034445 A1 | 2/2003 | Boyd |
| 2003/0095770 A1 | 5/2003 | Fewkes |

(56) References Cited

U.S. PATENT DOCUMENTS

| | | |
|---|---|---|
| 2003/0118807 A1 | 6/2003 | Laney et al. |
| 2003/0211317 A1 | 11/2003 | Sheridan |
| 2003/0228459 A1 | 12/2003 | Mrozinski et al. |
| 2005/0052750 A1 | 3/2005 | King |
| 2005/0058821 A1 | 3/2005 | Smith et al. |
| 2005/0070976 A1 | 3/2005 | Samuel |
| 2005/0254240 A1 | 11/2005 | Lawrence et al. |
| 2005/0265029 A1 | 12/2005 | Epstein et al. |
| 2005/0276071 A1 | 12/2005 | Sasagawa |
| 2005/0286124 A1* | 12/2005 | Ma et al. ............... 359/443 |
| 2006/0002126 A1 | 1/2006 | Koizumi et al. |
| 2006/0028829 A1 | 2/2006 | Amano et al. |
| 2006/0034094 A1 | 2/2006 | Asada et al. |
| 2006/0035039 A1 | 2/2006 | Ylitalo et al. |
| 2006/0044825 A1 | 3/2006 | Sa |
| 2006/0056166 A1 | 3/2006 | Yeo et al. |
| 2006/0084780 A1 | 4/2006 | Hebrink |
| 2006/0105149 A1* | 5/2006 | Donahue ............... 428/195.1 |
| 2006/0119250 A1 | 6/2006 | Suehiro et al. |
| 2006/0124938 A1 | 6/2006 | Miller et al. |
| 2006/0148915 A1 | 7/2006 | Floyd et al. |
| 2006/0171159 A1 | 8/2006 | Anderlini |
| 2006/0187552 A1 | 8/2006 | Huang |
| 2006/0216523 A1 | 9/2006 | Takaki |
| 2006/0216524 A1 | 9/2006 | Klun |
| 2006/0226561 A1 | 10/2006 | Merrill |
| 2006/0256572 A1 | 11/2006 | Lin |
| 2006/0285348 A1 | 12/2006 | Valcamp et al. |
| 2007/0006493 A1 | 1/2007 | Eberwein |
| 2007/0026167 A1 | 2/2007 | Bourdelais et al. |
| 2007/0031641 A1 | 2/2007 | Frisch |
| 2007/0047080 A1 | 3/2007 | Stover |
| 2007/0081254 A1 | 4/2007 | Endle |
| 2007/0110960 A1 | 5/2007 | Frey |
| 2007/0120137 A1 | 5/2007 | Wilson et al. |
| 2007/0152834 A1 | 7/2007 | Mimura |
| 2007/0191506 A1 | 8/2007 | Lu et al. |
| 2007/0201246 A1 | 8/2007 | Yeo et al. |
| 2007/0209244 A1 | 9/2007 | Prollius |
| 2007/0223252 A1 | 9/2007 | Lee et al. |
| 2007/0242356 A1 | 10/2007 | Thakkar |
| 2007/0243844 A1* | 10/2007 | Cunningham et al. ......... 455/255 |
| 2007/0267133 A1 | 11/2007 | Matano |
| 2007/0279391 A1 | 12/2007 | Marttila |
| 2007/0279935 A1 | 12/2007 | Gardiner |
| 2007/0292650 A1 | 12/2007 | Suzuki |
| 2008/0049438 A1 | 2/2008 | Bloemen et al. |
| 2008/0049446 A1 | 2/2008 | Harbers et al. |
| 2008/0053800 A1 | 3/2008 | Hoyle |
| 2008/0074901 A1 | 3/2008 | David |
| 2008/0080199 A1 | 4/2008 | Sassoon |
| 2008/0084518 A1 | 4/2008 | Brott et al. |
| 2008/0118862 A1 | 5/2008 | Dunn |
| 2008/0130126 A1 | 6/2008 | Brooks |
| 2008/0232135 A1 | 9/2008 | Kinder |
| 2008/0291361 A1* | 11/2008 | Weber ............... 349/62 |
| 2009/0067151 A1 | 3/2009 | Sahlin |
| 2009/0105437 A1 | 4/2009 | Determan et al. |
| 2009/0154141 A1 | 6/2009 | Hsiao |
| 2009/0229732 A1 | 9/2009 | Determan |
| 2009/0229766 A1 | 9/2009 | Aveldson |
| 2010/0026727 A1 | 2/2010 | Bita et al. |
| 2010/0046918 A1 | 2/2010 | Takao |
| 2010/0046929 A1 | 2/2010 | Takao |
| 2010/0046930 A1 | 2/2010 | Takao |
| 2010/0046931 A1 | 2/2010 | Takao |
| 2010/0048804 A1 | 2/2010 | Determan |
| 2010/0103521 A1 | 4/2010 | Smith |
| 2010/0103528 A1 | 4/2010 | Endle et al. |
| 2010/0103650 A1 | 4/2010 | Herrmann |
| 2010/0141557 A1 | 6/2010 | Gruhlke et al. |
| 2010/0156953 A1 | 6/2010 | Nevitt et al. |
| 2010/0165621 A1 | 7/2010 | Hoffend, Jr. et al. |
| 2010/0165660 A1 | 7/2010 | Weber et al. |
| 2010/0222496 A1 | 9/2010 | Determan |
| 2010/0238686 A1 | 9/2010 | Weber et al. |
| 2010/0265584 A1 | 10/2010 | Coggio et al. |
| 2010/0297406 A1 | 11/2010 | Schaffer |
| 2010/0322591 A1 | 12/2010 | Takao |
| 2011/0002593 A1 | 1/2011 | Takao |
| 2011/0002662 A1 | 1/2011 | Takao |
| 2011/0020640 A1 | 1/2011 | Sherman |
| 2011/0039099 A1 | 2/2011 | Sherman et al. |
| 2011/0064916 A1 | 3/2011 | Sherman |
| 2011/0075398 A1 | 3/2011 | Wheatley et al. |
| 2011/0090423 A1 | 4/2011 | Wheatley et al. |
| 2011/0096529 A1 | 4/2011 | Wheatley et al. |
| 2011/0109965 A1 | 5/2011 | Gates |
| 2011/0122494 A1 | 5/2011 | Sherman |
| 2011/0123800 A1 | 5/2011 | Sherman et al. |
| 2011/0126868 A1 | 6/2011 | Waldmann |
| 2011/0126968 A1 | 6/2011 | Determan et al. |
| 2011/0165361 A1 | 7/2011 | Sherman |
| 2011/0170184 A1 | 7/2011 | Wolk |
| 2011/0176325 A1 | 7/2011 | Sherman |
| 2011/0182076 A1 | 7/2011 | Sherman |
| 2011/0253301 A1 | 10/2011 | Yamanaka |
| 2011/0255165 A1 | 10/2011 | Smith |
| 2011/0255171 A1 | 10/2011 | Endle |
| 2011/0268929 A1 | 11/2011 | Tran |
| 2012/0026431 A1 | 2/2012 | Coggio et al. |
| 2012/0027945 A1 | 2/2012 | Kolb et al. |
| 2012/0038850 A1 | 2/2012 | Hao et al. |
| 2012/0038990 A1 | 2/2012 | Hao et al. |
| 2012/0039089 A1 | 2/2012 | Hao et al. |
| 2012/0100039 A1 | 4/2012 | Appeaning et al. |

FOREIGN PATENT DOCUMENTS

| | | |
|---|---|---|
| CN | 1657816 | 8/2005 |
| CN | 201021777 | 2/2008 |
| DE | 19758551 | 7/1999 |
| DE | 10-2005-037680 | 2/2007 |
| EP | 0 291 206 | 11/1988 |
| EP | 0890503 | 1/1999 |
| EP | 0678703 | 6/1999 |
| EP | 1574779 | 9/2005 |
| EP | 1724621 | 11/2006 |
| EP | 1762433 | 3/2007 |
| EP | 1 477 368 | 8/2007 |
| EP | 1857354 | 11/2007 |
| EP | 1892147 | 2/2008 |
| EP | 1332957 | 9/2008 |
| EP | 2020614 | 2/2009 |
| EP | 2028412 | 2/2009 |
| FR | 2872256 | 12/2005 |
| JP | 06349305 | 12/1994 |
| JP | 2000-040412 | 2/2000 |
| JP | 2000-331508 | 11/2000 |
| JP | 2001-216817 | 8/2001 |
| JP | 2003-149643 A | 11/2001 |
| JP | 2002-208308 A | 7/2002 |
| JP | 2003-149642 A | 5/2003 |
| JP | 2005-078938 | 3/2005 |
| JP | 2005-302951 | 10/2005 |
| JP | 2006-049232 | 2/2006 |
| JP | 2006-059541 | 3/2006 |
| JP | 2006-108033 A | 4/2006 |
| JP | 2006-131084 | 5/2006 |
| JP | 2006-227140 A | 8/2006 |
| JP | 2006-290232 | 10/2006 |
| JP | 2006-294343 A | 10/2006 |
| JP | 2006-318718 | 11/2006 |
| JP | 2007-123028 | 5/2007 |
| JP | 2007114271 | 5/2007 |
| JP | 2007-207667 | 8/2007 |
| JP | 2007-227222 | 9/2007 |
| JP | 2007-323839 | 12/2007 |
| JP | 2007-324001 | 12/2007 |
| JP | 4023777 | 12/2007 |
| JP | 2008-003243 | 1/2008 |
| KR | 2001-0091192 | 10/2001 |
| KR | 2007-0111830 | 11/2007 |
| TW | 281971 | 6/2007 |

(56) References Cited

FOREIGN PATENT DOCUMENTS

| | | |
|---|---|---|
| WO | WO 94-02022 | 2/1994 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 99/42536 | 8/1999 |
| WO | WO 99-62822 | 12/1999 |
| WO | WO 00-56828 | 9/2000 |
| WO | WO 00-78885 | 12/2000 |
| WO | WO 01-45980 | 6/2001 |
| WO | WO 01/71396 | 9/2001 |
| WO | WO 02/057384 A2 | 7/2002 |
| WO | WO 02/070237 | 9/2002 |
| WO | WO 2003-027568 | 4/2003 |
| WO | WO 2003-037504 | 5/2003 |
| WO | WO 2006-026743 | 3/2006 |
| WO | WO 2006-098958 | 9/2006 |
| WO | WO 2006/125174 | 11/2006 |
| WO | WO 2007/075518 | 7/2007 |
| WO | WO 2007/092152 | 8/2007 |
| WO | WO 2007-127894 | 11/2007 |
| WO | WO 2007/143383 | 12/2007 |
| WO | WO 2008/016978 | 2/2008 |
| WO | WO 2008/022007 | 2/2008 |
| WO | WO 2008/045200 | 4/2008 |
| WO | WO 2008/045207 | 4/2008 |
| WO | WO 2008/060731 | 5/2008 |
| WO | WO 2008/076612 | 6/2008 |
| WO | WO 2008-106915 | 9/2008 |
| WO | WO 2008/121475 | 10/2008 |
| WO | WO 2008-127738 | 10/2008 |
| WO | WO 2009-011684 | 1/2009 |
| WO | WO 2009-048742 | 4/2009 |
| WO | WO 2009-048743 | 4/2009 |
| WO | WO 2009-054553 | 4/2009 |
| WO | WO 2009-057844 | 5/2009 |
| WO | WO 2009-058513 | 5/2009 |
| WO | WO 2009-061673 | 5/2009 |
| WO | WO 2009-089137 | 7/2009 |
| WO | WO 2009-114683 | 9/2009 |
| WO | WO 2009-131839 | 10/2009 |
| WO | WO 2010-005655 | 1/2010 |
| WO | WO 2010/005810 | 1/2010 |
| WO | WO 2010/006102 | 1/2010 |
| WO | WO 2010-021796 | 2/2010 |
| WO | WO 2010-033571 | 3/2010 |
| WO | WO 2010-048416 | 4/2010 |
| WO | WO 2010-120468 | 10/2010 |
| WO | WO 2010-120864 | 10/2010 |
| WO | WO 2010-132176 | 11/2010 |
| WO | WO 2010-151563 | 12/2010 |
| WO | WO 2011-008441 | 1/2011 |
| WO | WO 2011-022023 | 2/2011 |
| WO | WO 2011-022525 | 2/2011 |
| WO | WO 2011-050228 | 4/2011 |
| WO | WO 2011-050232 | 4/2011 |
| WO | WO 2011-050236 | 4/2011 |
| WO | WO 2011-050254 | 4/2011 |
| WO | WO 2011-053804 | 5/2011 |
| WO | WO 2011-068754 | 6/2011 |
| WO | WO 2011-088161 | 7/2011 |
| WO | WO 2011-088216 | 7/2011 |
| WO | WO 2011-100277 | 8/2011 |
| WO | WO 2012-027377 | 3/2012 |

OTHER PUBLICATIONS

3M Scotchal™ Translucent Graphic Film IJ3630-20 Product Bulletin, Jul. 2005, 1 page.
3M™ Flexible Light Mat Series 3635-1000 Product Bulletin, The Beauty of Thinking Outside the Box, Jul. 2010, pp. 1-6.
ASTM D1003-11, "Standard Test Method for Haze and Luminous Transmittance of Transparent Plastics". 2011, 7 pages.
ASTM D2240-05, "Standard Test Method for Rubber Property—Durometer Hardness", 2005 (Reapproved 2010), 13 pages.
ASTM D4065-06, "Standard Practice for Plastics: Dynamic Mechanical Properties: Determination and Report of Procedures", 2006, 7 pages.
ASTM D412-06, "Standard Test methods for Vulcanized Rubber and Thermoplastic Elastomers Tension", 2006, 14 pages.
ASTM D4440-08, "Standard Test Method for Plastics: Dynamic Mechanical Properties Melt Rheology", 2008, 5 pages.
ASTM D5279-08, "Standard Test Method for Plastics: Dynamic Mechanical Properties: In Torsion", 2008, 4 pages.
Capodagli, "Isothermal viscoelastic properties of PMMA and LDPE over 11 decades of frequency and time: a test of time-temperature superposition", Rheologica Acta, vol. 47, Jun. 13, 2008, pp. 777-786.
"OLED 'light bandage' helps in treatment of skin cancer," LEDs Magazine, Nov. 2, 2006, 2 pages.
Parke, "Anelasticity and viscoelasticity in glass", British Journal of Applied Physics, vol. 14, Feb. 18, 1963, pp. 243-248.
Satas, "Viscoelastic Properties of Commercial Pressure Sensitive Adhesives", Handbook of Pressure Sensitive Adhesive Technology, Second Edition, 1989, pp. 170-177.
Spartech, Spartech Polycast Acrylic Sheet, General Catalog, (date unknown but believed to be prior to the date of the filing of the present application), pp. 1-11.
"Viscoelasticity", Wikipedia, [retrieved from the Internet on Apr. 11, 2011], URL:http://en.wikipedia.org/wiki/Viscoelasticity, 9 pages. (XP-002632358).
Williams, "Good News! Polymer OLED Technology Is About to Come to a Sticky End," Electronics World, Oct. 2007, p. 40-41.
International Search Report for PCT/US2009/052198, mailed Dec. 28, 2009, 3 pages.
Written Opinion for PCT/US2009/052198, mailed Dec. 28, 2009, 3 pages.
International Search Report for PCT/US2010/039580, mailed Dec. 15, 2010, 3 pages.
U.S. Appl. No. 61/294,600 entitled "Microstructured Low Refractive Index Articles," filed Jan. 13, 2010.
U.S. Appl. No. 61/294,577 entitled "Microstructured Low Refractive Index Article Process," filed Jan. 13, 2010.
U.S. Appl. No. 61/391,766 entitled Illumination Device Having Viscoelastic Lightguide, filed Oct. 11, 2010.
U.S. Appl. No. 61/446,740 entitled Front-Lit Reflective Display Device and Method of Front-Lighting Reflective Display, filed Feb. 25, 2011.
U.S. Appl. No. 61/446,642 entitled Variable Index Light Extraction Layer and Method of Illuminating with Same, filed Feb. 25, 2011.
U.S. Appl. No. 61/446,712 entitled Illumination Article and Device for Front-Lighting Reflective Scattering Element, filed Feb. 25, 2011.
U.S. Appl. No. 61/485,881 entitled Back-lit Transmissive Display Having Variable Index Light Extraction Layer filed May 13, 2011.
Handbook of Pressure Sensitive Adhesive Technology, Second Edition, edited by Donatas Satas, Van Nostrand Reinhold, New York, 1989, pp. 170-177.
U.S. Appl. No. 61/294,689 entitled "Devices and method with Viscoelastic Material," filed Jan. 13, 2010.
Falk, et al., "Seeing the Light—Optics in Nature, Photography, Color, Vision, and Holography," Chapter 2: Principles of Geometrical Optics, pp. 53-57.

* cited by examiner

LIGHTGUIDE HAVING A VISCOELASTIC LAYER FOR MANAGING LIGHT

CROSS REFERENCE TO RELATED APPLICATIONS

This application is a national stage filing under 35 U.S.C. 371 of PCT/US2009/052198, filed Jul. 30, 2009, which claims priority to U.S. Provisional Application No. 61/087,387, filed Aug. 8, 2008, and U.S. Provisional Application No. 61/114,849 filed Nov. 14, 2008, the disclosures of which are incorporated by reference in their entirety herein.

FIELD

This disclosure relates to optical articles and devices, particularly lightguides used to facilitate distribution of light in electronic devices.

BACKGROUND

Lightguides are used to facilitate distribution of light from a light source over an area much larger than the light source. Lightguides comprise optically transmissive materials and may have different forms such as slab, wedge, and pseudo-wedge forms. Most lightguides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

SUMMARY

Disclosed herein is an optical device comprising a light source and an optical article, the optical article comprising a lightguide and a viscoelastic layer disposed on the lightguide, wherein light emitted by the light source enters the lightguide and is transported within the lightguide by total internal reflection. In some embodiments, the optical device is designed so that at least about 50% of light that enters the lightguide is extracted from the lightguide and into the viscoelastic layer. In other embodiments, the optical device is designed such that less than about 10% of light that enters the lightguide is extracted into the viscoelastic layer. In other embodiments, the optical device is designed such that the viscoelastic layer comprises first and second regions having different refractive indices, wherein at least about 50% of light that enters the lightguide is extracted from the lightguide and into the first region, and/or less than about 10% of light that enters the lightguide is extracted from the lightguide and into the second region.

The optical device can be used in a variety of constructions for signs, markings, display devices, keypad assemblies, tail light assemblies and illumination devices.

These and other aspects of the invention are described in the detailed description below. In no event should the above summary be construed as a limitation on the claimed subject matter which is defined solely by the claims as set forth herein.

BRIEF DESCRIPTION OF DRAWINGS

Advantages and features of the invention may be more completely understood by consideration of the following figures in connection with the detailed description provided below. The figures are schematic drawings of various optical articles and are not necessarily drawn to scale.

DETAILED DESCRIPTION

Figure 1A:
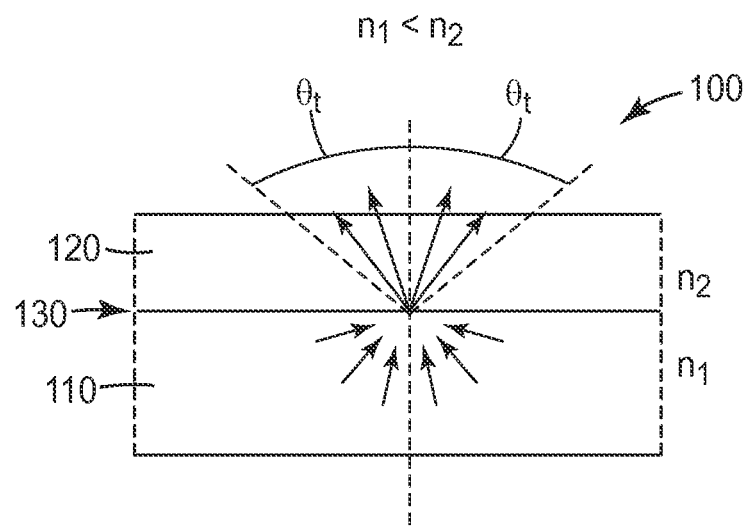
FIGS. 1a and 1b are schematic cross sections of layers illustrating principles of geometric optics.

This disclosure relates to U.S. Provisional Application Nos. 61/087,387 filed on Aug. 8, 2008 (Sherman et al.); 61/114,849 filed on Nov. 14, 2008 (Sherman et al.); 61/079,639 filed on Jul. 10, 2008 (Sherman et al.); 61/114,865 filed on Nov. 14, 2008 (Sherman et al.); and 61/169,973 filed on Apr. 16, 2009 (Sherman et al.), all incorporated herein by reference.

The optical device disclosed herein includes a light source that emits light, and the light is managed by an optical article comprising a lightguide and a viscoelastic layer. The optical device may provide one or more advantages. For example, the viscoelastic layer may comprise a PSA which is generally tacky at room temperature. A tacky layer may facilitate assembly of various product constructions because a separate adhesive layer may not be needed for bonding a component to the optical device or article.

The optical device may be used to provide light anywhere it is desired. The optical device may be designed for interior and/or exterior use, including household, commercial and/or industrial use. The optical device may be used and/or provided in a construction so that it is portable, i.e., it is a portable source of light. Lighted tapes, signs, labels, stickers, cut-outs, etc. are examples of portable constructions that may be made using the optical device. The optical device may also be used and/or provided in a more stationary construction such as in an electronic display device.

The optical device may also be used to provide "light on demand", e.g., the light source may be activated only under certain conditions such as when parking a vehicle. The optical device may be used to provide exterior lighting of a vehicle, e.g., for tail lights, replacing tail light cavities and their lighting assemblies and which are very space consuming.

The optical article can be used in place of a conventional lightguide used to light display devices. For example, the optical article may be used to replace a solid or hollow lightguide that distributes light from one or more substantially linear or point light sources. The optical article can be assembled in a display device without the need for additional materials to bond the lightguide to the display device.

The optical device may also be very adaptable, even by a user, so that it can be used in different lighting forms and constructions. For example, the optical article may be provided in roll or sheet form such that it can be cut into various shapes and sizes. The light source may also be interchangeable with the optical article, for example, if the light source should become unusable or if a different color of light is desired. Further, if used in a sign construction, graphics can be interchanged, for example, if one would like to update an advertisement.

The optical device may provide many more advantages. The optical device can be used to provide light that is bright, diffuse, uniform and/or concentrated over particular areas. The optical device may provide advantages by being thin, flexible (can be flexed by hand) and/or lightweight, and it may even be conformable to a particular shape and size. The optical article may be tiled to light large areas which may be made easier if the optical articles can be stuck together. Due to its viscoelastic properties, the viscoelastic layer may dampen stresses experienced by the optical device or construction in which the device is used. The optical article, when disposed on a substrate, may be removable and/or repositionable over time. The optical device may also provide advantages related to cost, because it can be made from commercially available light sources and materials. Additional advantages are described below.

The optical device disclosed herein comprises a lightguide and a light source. Light is emitted by the light source, enters the lightguide, and propagates, reflects, and/or refracts according to the law of refraction and the principle of total internal reflection. The behavior of light within the lightguide may depend on a variety of factors such as the surface structure of the lightguide, the presence (or absence) of additional substrate(s) in contact with the lightguide, and/or the material compositions of the lightguide and any additional substrate(s) in contact with the lightguide. In addition, the behavior of light within the lightguide may depend on the angular distribution of light that enters the lightguide.

A brief description of the law of refraction and total internal reflection is provided for the convenience of the reader. This brief description forms the basis for understanding the behavior of light with respect to the optical device disclosed herein. For a detailed description of the behavior of light see, for example: "Seeing the Light" by D. S. Falk et al., John Wiley and Sons, Inc., 1986, pp. 53-56.

Figure 1B:
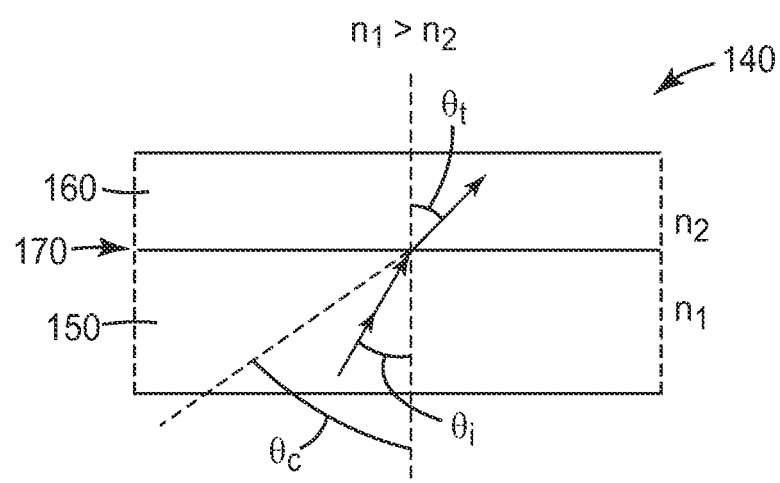

The law of refraction is illustrated in FIGS. 1a and 1b for a given pair of first and second layers. Light (represented by one or more rays for simplicity) propagates within the first layer and strikes the interface between the two layers. The light refracts, at a transmittance angle $\theta_t$, into the second layer according to the law of refraction:

$$\sin \theta_t = (n_1/n_2)(\sin \theta_i)$$

wherein $\theta_i$ is the incident angle, and $n_1$ and $n_2$ are the refractive indices of the first and second layers, respectively.

FIG. 1a shows a pair of layers 100 having first layer 110 and second layer 120 with refractive indices $n_1$ and $n_2$, respectively, such that $n_1 < n_2$. Light propagating within the first layer strikes interface 130 at many different incident angles and refracts into the second layer at angles within the transmittance angles $\theta_t$.

FIG. 1b shows a pair of layers 140 having first layer 150 and second layer 160 with refractive indices $n_1$ and $n_2$, respectively, such that $n_1 > n_2$. Light propagating within the first layer strikes interface 170 at incident angle $\theta_i$ and refracts at transmittance angle $\theta_t$ into the second layer according to the law of refraction. Only light having an incident angle less than or equal to critical angle $\theta_c$ will enter the second layer. All other light incident upon the interface is reflected. The critical angle $\theta_c$ is defined as:

$$\sin \theta_c = n_2/n_1$$

In general, total internal reflection occurs when light having a particular angular component or distribution is incident upon an interface at one or more angles greater than the critical angle $\theta_c$.

Figure 2A:
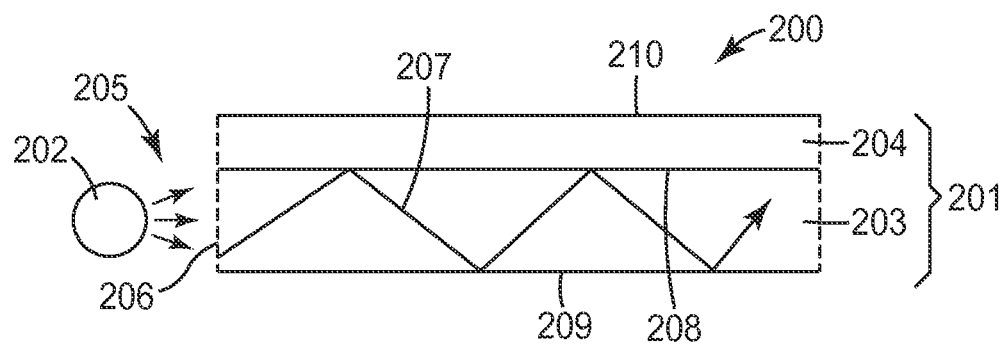
FIG. 2a shows a schematic cross section of an exemplary optical device.

FIG. 2a shows an exemplary optical device 200 comprising optical article 201 and light source 202. Optical article 201 comprises viscoelastic layer 204 disposed on lightguide 203. Light source 202 is positioned relative to lightguide 203 such that light emitted by the light source enters the lightguide and is transported within the lightguide by total internal reflection. Light emitted by the light source is represented by rays 205 which enter lightguide 203 through input surface 206 adapted to receive light from the light source. Light within the lightguide is represented by single ray 207 which is transported by total internal reflection. At least a portion of the lightguide has an optically smooth surface 208 and/or 209. Viscoelastic layer 204 comprises upper surface 210.

An optically smooth surface, as used herein, means that the surface is smooth enough such that light incident upon the surface is not affected undesirably by the surface, e.g., the surface is free of defects having at least one dimension larger than the wavelength of the incident light. The optically smooth surface allows at least some of the light entering the lightguide to be reflected at the surface such that this light continues to propagate within the layer according to the principle of total internal reflection.

In general, light propagating within the lightguide is either reflected or extracted from the lightguide. For reflection of light incident on an optically smooth surface, the observed reflection angle is within about 10° of the calculated reflection angle. Likewise, for refraction of light incident on an optically smooth surface, the observed transmittance angle is within about 10° of the calculated transmittance angle. Total internal reflection occurs if a predetermined amount, or at least within about 10% of a predetermined amount, of light does not escape the lightguide unless it is intentionally extracted from the lightguide.

In general, the surfaces of the lightguide may be unstructured as shown in FIG. 2a, or they may have any three-dimensional structure depending on the desired effect. In general, a surface of the lightguide may comprise at least one feature that extends along a portion of the surface and is oriented to extract light from the lightguide. In some embodiments, the at least one feature comprises a plurality of features, the features comprising protrusions, depressions, or a combination thereof. Exemplary features comprise protrusions and/or depressions having lenticular, prismatic, ellipsoidal, conical, parabolic, pyramidal, square, or rectangular shapes, or a combination thereof. Features comprising lenses are particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. A lightguide may have features that are all the same shape, but the sizes of the shapes may vary in at least one dimension. A lightguide may also have features that are different shapes, and the sizes of these features may or may not vary in any given dimension.

Surface structures of the features may also be varied. Surface structure of a feature generally refers to the sub-structure of the feature. Exemplary surface structures include optically smooth surfaces, irregular surfaces, patterned surfaces, or a combination thereof. For a lightguide having a plurality of features, each of the features may have the same surface structure. For a lightguide having a plurality of features, some of the features may have the same surface structure. For a lightguide having a plurality of features, each of the features may have a different surface structure. The surface structure of a feature may vary over portions of the feature.

An optically smooth surface of a feature may form part of the optically smooth surface of the lightguide. The optically smooth surfaces of the feature and the lightguide may be continuous or discontinuous with each other. If a plurality of features is used, the surfaces of some extracting features may be completely optically smooth or some may be partially optically smooth. The optically smooth surface may be in contact with an adjacent lightguide or substrate on which the lightguide is disposed.

The number of features, if used, for a given lightguide is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be arranged to obtain a desired optical effect. The features may be arranged to extract light uniformly or as a gradient from the lightguide, to hide discrete light sources, or to reduce Moiré.

The features may be used to control the amount and/or direction of light extracted from the lightguide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the lightguide. This may be carried out using ray tracing techniques consistent with the law of refraction and the principle of total internal reflection.

The shape of a feature may change the angular component of light which can increase or decrease the amount of light extracted from the lightguide. This may be the case if light propagates by total internal reflection within the lightguide and strikes a surface of a feature at an angle less than, equal to, or greater than the critical angle for the lightguide and air and/or an adjacent substrate(s). The amount of light extracted from the lightguide may increase or decrease accordingly.

The size of a feature may be changed such that more or less light can reflect off a surface of the feature, thus increasing or decreasing the amount of light extracted from the lightguide.

The surface structure of a feature may be used to control the distribution of light that is extracted from the lightguide. Light having a particular angular distribution may strike a feature and be extracted uniformly and/or randomly from the lightguide. Light may also be extracted uniformly and in a pattern, or randomly and in a pattern.

Figure 2B:
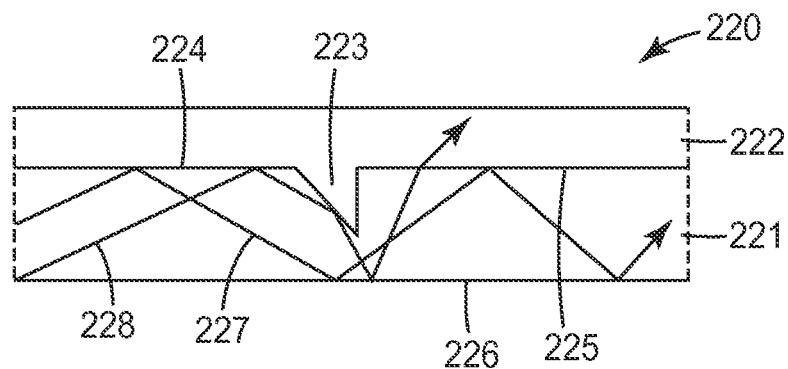
FIGS. 2b-2d show schematic cross sections of exemplary optical articles.
Figure 2C:
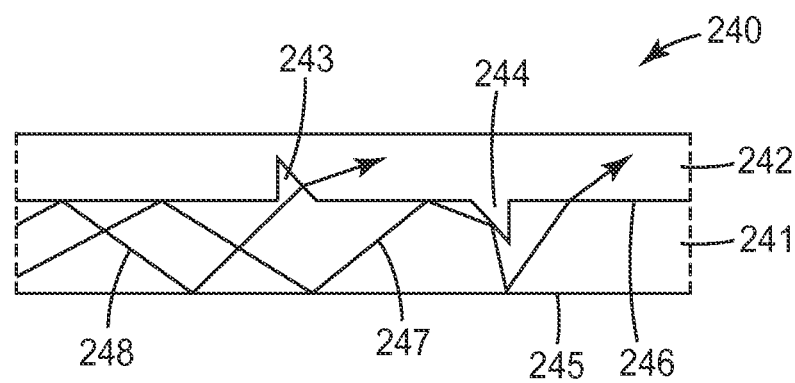
Figure 2D:
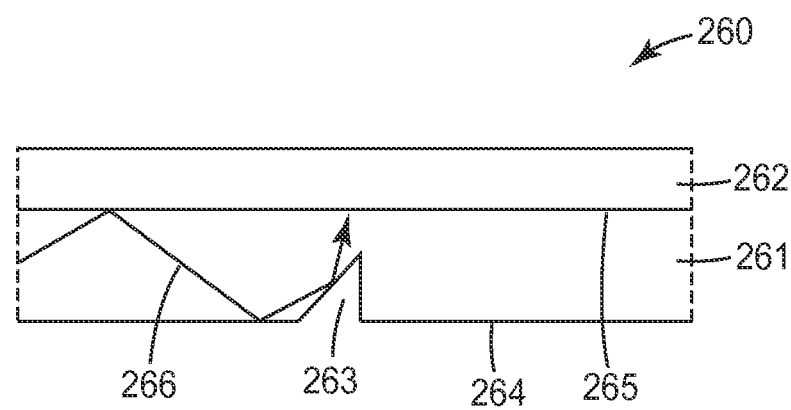

The optical article is designed and arranged to control light in a predetermined way, for example, by light being extracted from the lightguide at one or more desired locations or areas. In general, the optically smooth surface may include the surface(s) of the extracting feature(s). FIGS. 2b-2d show examples wherein the optically smooth surface comprises the surfaces of extracting features.

FIG. 2b shows a schematic cross section of exemplary optical article 220 comprising viscoelastic layer 222 disposed on lightguide 221. In general, the interface formed between the lightguide and the viscoelastic layer may comprise a plurality of features oriented to extract light being transported within the lightguide. A surface of the lightguide may comprise at least one feature that extends along a portion of the surface and is oriented to extract light from the lightguide. Optical article 220 comprises feature 223. In this example, the feature is a notch-like depression of interface 224. Surfaces 225 and 226 are optically smooth surfaces. The surfaces of feature 223 are optically smooth surfaces. Exemplary behavior of light within optical article 220 is shown by rays 227 and 228. Light represented by ray 227 propagates by total internal reflection within lightguide 221. Light represented by ray 228 propagates by total internal reflection within lightguide 221 and eventually strikes a surface of feature 223. As a result, the angular component of ray 228 is changed, and light represented by this ray can strike interface 224 at an angle less than the critical angle such that the light is extracted from the lightguide. Thus, as exemplified in FIG. 2b, the amount of light extracted from the lightguide may be increased. The direction in which light may be extracted from the lightguide may be varied by changing the orientation of feature 223 such that the angle at which ray 228 strikes the feature is increased or decreased but remains less than or equal to the critical angle.

FIG. 2c shows a schematic cross section of exemplary optical article 240 comprising viscoelastic layer 242 disposed on lightguide 241. Optical article 240 comprises features 243 and 244. In this example, the features are notch-like features with one being a protrusion and the other a depression. Surfaces 245 and 246 are optically smooth surfaces. The surfaces of the features are optically smooth surfaces. Exemplary behavior of light within optical article 240 is shown by rays 247 and 248. Light represented by ray 247 propagates by total internal reflection within lightguide 241 and eventually strikes a surface of feature 244. As a result, the angular component of ray 247 is changed, and light represented by this ray can strike surface 246 at an angle less than the critical angle such that the light is extracted from the lightguide. Light represented by ray 248 propagates by total internal reflection within lightguide 241 and eventually strikes a surface of feature 243. As a result, the angular component of ray 2248 is changed, and light represented by this ray can be extracted from the lightguide. Thus, as exemplified in FIG. 2c, the amount of light extracted from the lightguide may be increased, and the direction(s) in which light may be extracted from the lightguide may be varied by changing the orientation of the feature(s).

FIG. 2d shows a schematic cross section of exemplary optical article 260 comprising viscoelastic layer 262 disposed on lightguide 261. Optical article 260 comprises feature 263. In this example, the feature is a notch-like feature. Surfaces 264 and 265 are optically smooth surfaces. The surfaces of feature 263 are optically smooth surfaces. Exemplary behavior of light within lightguide 261 is shown by ray 266. Light represented by ray 266 propagates by total internal reflection within lightguide 261 and eventually strikes a surface of feature 263. As a result, the angular component of ray 266 is changed, and light represented by this ray can strike surface 265 at an angle less than the critical angle such that the light is extracted from the lightguide.

Figure 3A:
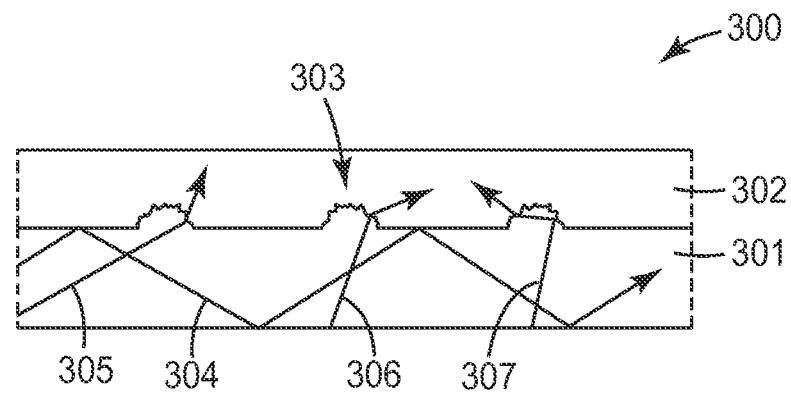
FIGS. 3a and 3b show schematic cross sections of exemplary optical articles.
Figure 3B:
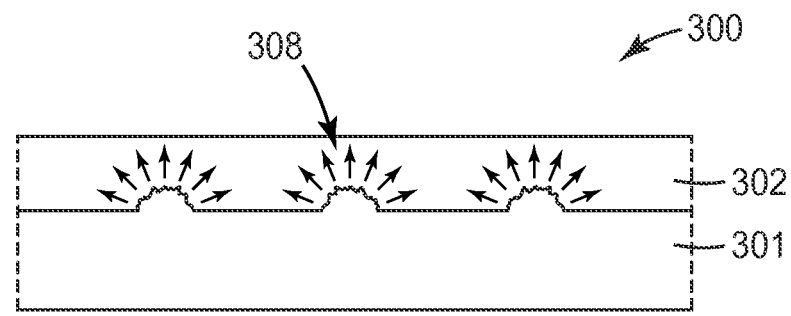

FIGS. 3a and 3b show examples wherein the optically smooth surface does not comprise the surfaces of the extracting features. The optically smooth surface may include a portion of the surface of an extracting feature. If a plurality of extracting features are used, then a combination of the above may be used, i.e., some extracting features may have completely optically smooth surfaces, some may have completely non-optically smooth surfaces, and/or some extracting features may have partially optically smooth and partially non-optically smooth surfaces. The optically smooth surface may be continuous or non-continuous over the surface of the lightguide. At least a portion of the optically smooth surface is in contact with the viscoelastic layer.

FIG. 3a shows a schematic cross section of exemplary optical article 300 comprising viscoelastic layer 302 disposed on lightguide 301. Optical article 300 comprises features 303 having non-optically smooth surfaces. Light having different angular components is represented by rays 304-307 which propagates by total internal reflection within lightguide 301. Light represented by rays 305-307 is extracted into viscoelastic layer 302 because they strike the interface at an angle less than that of the critical angle. Light represented by ray 304 reflects at the interface because the incident angle is greater than the critical angle.

FIG. 3b shows a schematic cross section of exemplary optical article 300. Light propagating within lightguide 301 can strike the interface in any number of ways if the light has various angular components. In this example, light represented by rays 308 is diffused upon being extracted from viscoelastic layer 301. Thus, light can be extracted differently depending on its properties. Light can be extracted in discrete groupings such as might be used to illuminate keys on a keypad.

Refractive index differences between the lightguide and the viscoelastic layer may be made by appropriate selection of materials. The lightguide may have a refractive index greater than that of the viscoelastic layer. The refractive index of the lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the viscoelastic layer.

The lightguide may have a refractive index less than that of the viscoelastic layer. The refractive index of the lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the viscoelastic layer.

The lightguide and the viscoelastic layer may have the same or nearly the same refractive index such that light can be extracted into the viscoelastic layer with little or no change to the light. The refractive index difference of the lightguide and the viscoelastic layer may be from about 0.001 to less than about 0.002.

The refractive index difference of the lightguide and the viscoelastic layer may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The law of refraction and the principle of total internal reflection can be applied as described above to determine the amount of light extracted from the lightguide given a particular viscoelastic layer directly in contact with the lightguide. For example, given a particular viscoelastic layer in contact with the lightguide, the amount of light extracted from the lightguide and by the viscoelastic layer may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the lightguide. For another example, given a particular viscoelastic layer in contact with the lightguide, the amount of light extracted from the lightguide by the viscoelastic layer may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. For yet another example, given a particular viscoelastic layer in contact with the lightguide, the amount of light extracted from the lightguide may be from about 10 to about 50%, from about 20 to about 50%, from about 30 to about 50%, from about 50 to about 70%, from about 50 to about 80%, or from about 10 to about 90% relative to the total amount of light that enters the lightguide.

The law of refraction and the principle of total internal reflection can be applied as described above to determine the direction of light extracted from the lightguide given a particular viscoelastic layer in contact with the lightguide. For example, given a particular viscoelastic layer in contact with the lightguide, the transmittance angle for light extracted from the lightguide by the viscoelastic layer may be determined for a given incident angle. For example, the transmittance angle for light extracted from the lightguide by the viscoelastic layer may be from greater than about 5° to less than about 95°, greater than about 5° to less than about 60°, or greater than about 5° to less than about 30°.

The amount of light extracted into the viscoelastic layer can also be controlled by varying the angular distribution of light that enters the lightguide. This may be carried out by appropriate selection of a light source(s) that is used with the optical article. Various light sources are described below. A light source that emits light having a random or a particular angular distribution may be used.

The amount and direction of light that enters the viscoelastic layer may be controlled, at the very least, by the shape, size, number, arrangement, etc. of the features, the refractive indices of the lightguide and the viscoelastic layer, the shape of the lightguide, and the angular distribution of light that is allowed to enter the lightguide.

The optical article may have any bulk three-dimensional shape as is needed for a given application. The optical article may be in the form of a square or rectangular layer, sheet, film, etc. as shown in FIGS. 7-11. The optical article may be cut or divided into shapes as described below. The lightguide may also be tapered such that it is thicker at one end as compared to an opposing end; tapered shapes are sometimes referred to as wedges or pseudo-wedges as described in the Boyd et al., Gardiner et al., Kinder et al., and Sahlin et al. references cited above.

The thickness of the lightguide is not particularly limited as long as it can function as desired. The thickness of the lightguide may be selected based on or in conjunction with the light source. For example, design parameters may limit or even require that a particular light source(s) be used, and there may be a minimum amount, or range of amounts, of light that is required to enter the lightguide. Thus, the thickness of the lightguide may be selected so that the required amount of light from a given light source can enter the lightguide. A maximum thickness of the lightguide may be required for use in optical devices designed to be particularly thin. Exemplary thicknesses for the lightguide range from about 0.4 mil to about 1000 mil, from about 1 mil to about 300 mil, from about 1 mil to about 60 mil, or from about 0.5 mil to about 30 mil.

The thickness of the viscoelastic layer is not particularly limited as long as it can function as desired. Exemplary thicknesses for the viscoelastic layer range from about 0.4 mil to about 1000 mil, from about 1 mil to about 300 mil, from about 1 mil to about 60 mil, or from about 0.5 mil to about 30 mil.

Figure 4A:
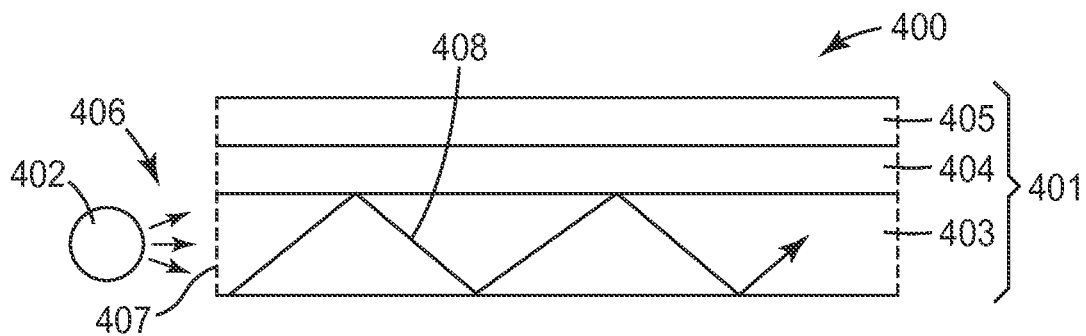
FIG. 4a shows a schematic cross section of an exemplary optical device.

The optical article disclosed herein may comprise a light emitting layer or first substrate disposed on the viscoelastic layer opposite the lightguide. The first substrate may be adapted to extract light from the viscoelastic layer according to the law of refraction and the principle of total internal reflection. FIG. 4a shows an exemplary optical device 400 comprising optical article 401 and light source 402. Optical article 401 comprises viscoelastic layer 404 disposed between lightguide 403 and first substrate 405. Light source 402 is positioned relative to lightguide 403 such that light emitted by the light source enters the lightguide and is transported within the lightguide by total internal reflection. Light emitted by the light source is represented by ray 408 which enters lightguide 403 through input surface 407 adapted to receive light from the light source.

In general, the interface formed by the viscoelastic layer and the first substrate may have any three-dimensional structure depending on the desired optical effect. The interface of the viscoelastic layer and the first substrate may be unstructured such that, for a given incident angle, the observed transmittance angle is within about 10° of the calculated transmittance angle. In some embodiments, there is an unstructured interface for the light emitting layer and the viscoelastic layer, and the refractive index of the light emitting layer is greater than, equal to, or less than that of the viscoelastic layer.

In some embodiments, the interface of the viscoelastic layer and the first substrate may be structured. A structured interface, as used herein, means that there is at least one feature that extends along at least a portion of the interface, and this feature may be used to control the amount and/or direction of light extracted into the first substrate. This can be carried out generally by varying the orientation of each feature, i.e., changing its shape, size and/or surface structure. If a plurality of features is used, then the amount and/or direction of light extracted into the first substrate can be controlled not only by the orientation of each feature, but also by the number and/or arrangement of the features. General design considerations are described above for features used to extract light from the lightguide. The features of the interface formed by the viscoelastic layer and the first substrate may comprise protrusions, depressions, or a combination thereof, as described above. Exemplary secondary extracting features are described in U.S. Ser. No. 12/199,862 (Sahlin, et al.) incorporated herein by reference.

Figure 4B:
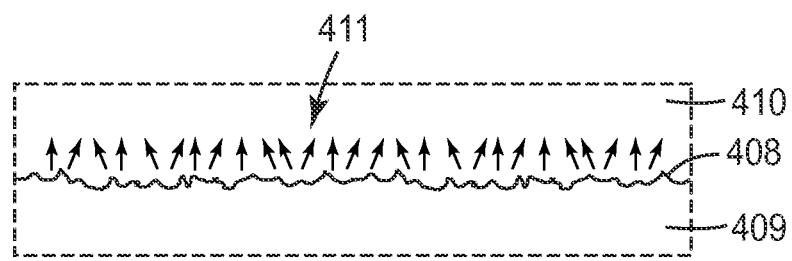
FIGS. 4b and 4c show schematic cross sections of exemplary interfaces formed between layers of optical articles.
Figure 4C:
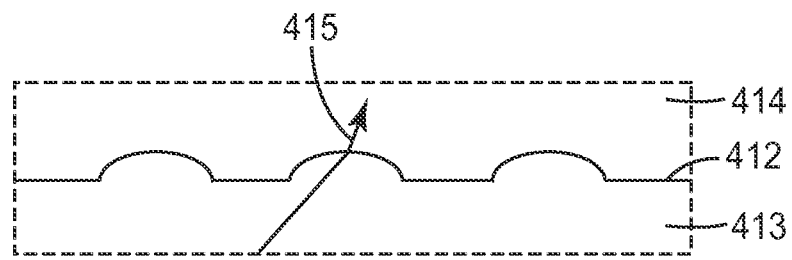

FIG. 4b shows a schematic cross section of exemplary interface 408 formed between first substrate 410 and viscoelastic layer 409. Interface 408 is irregular such that light represented by rays 411 is diffused upon entering the first substrate. FIG. 4c shows a schematic cross section of exemplary interface 412 formed between first substrate 414 and viscoelastic layer 413. Interface 412 comprises discreet convex lenticular features such that light represented by ray 415 is extracted into the first substrate at a predetermined direction.

Refractive index differences between the viscoelastic layer and the first substrate may be made by appropriate selection of materials. The viscoelastic layer may have a refractive index greater than that of the first substrate. The refractive index of the viscoelastic layer may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the first substrate.

The viscoelastic layer may have a refractive index less than that of the first substrate. The refractive index of the viscoelastic layer may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the first substrate.

The viscoelastic layer and the first substrate may have the same or nearly the same refractive index such that light can be extracted into the first substrate with little or no change to the light. The refractive index difference of the viscoelastic layer and the first substrate may be from about 0.001 to less than about 0.002.

The refractive index difference of the viscoelastic layer and the first substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The law of refraction and the principle of total internal reflection can be applied as described above to determine the amount of light extracted from the viscoelastic layer given a particular first substrate directly in contact with the viscoelastic layer. For example, given a particular first substrate in contact with the viscoelastic layer, the amount of light extracted from the viscoelastic layer and by the first substrate may be less than about 0.5%, less than about 1%, less than about 2%, less than about 5%, less than about 10%, less than about 20%, less than about 30%, less than about 40%, less than about 50%, less than about 60%, less than about 70%, less than about 80%, or less than about 90% relative to the total amount of light that enters the viscoelastic layer. For another example, given a particular first substrate in contact with the viscoelastic layer, the amount of light extracted from the viscoelastic layer by the first substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the viscoelastic layer. For yet another example, given a particular first substrate in contact with the viscoelastic layer, the amount of light extracted from the viscoelastic layer may be from about 10 to about 50%, from about 20 to about 50%, from about 30 to about 50%, from about 50 to about 70%, from about 50 to about 80%, or from about 10 to about 90% relative to the total amount of light that enters the viscoelastic layer.

The law of refraction and the principle of total internal reflection can be applied as described above to determine the direction of light extracted from the viscoelastic layer given a particular first substrate in contact with the viscoelastic layer. For example, given a particular first substrate in contact with the viscoelastic layer, the transmittance angle for light extracted from the viscoelastic layer by the first substrate may be determined for a given incident angle. For example, the transmittance angle for light extracted from the viscoelastic layer by the first substrate may be from greater than about 5° to less than about 95°, greater than about 5° to less than about 60°, or greater than about 5° to less than about 30°.

The light emitting layer or first substrate may comprise a surface for emitting light extracted from the viscoelastic layer. In general, this light emitting surface may have any three-dimensional structure depending on the desired optical effect. The light emitting surface may be unstructured such that, for a given incident angle, the observed transmittance angle is within about 10° of the calculated transmittance angle. In some embodiments, there is an unstructured light emitting surface, and the refractive index of the light emitting layer is greater than, equal to, or less than that of the viscoelastic layer.

In some embodiments, the light emitting surface may be structured. A structured surface, as used herein, means that there is at least one feature that extends along at least a portion of the surface, and this feature may be used to control the amount and/or direction of light emitted from the first substrate. This can be carried out generally by varying the orientation of each feature, i.e., changing its shape, size and/or surface structure. If a plurality of features is used, then the amount and/or direction of light emitted from the first substrate can be controlled not only by the orientation of each feature, but also by the number and/or arrangement of the features. General design considerations are described above for features used to extract light from the lightguide. The features of the light emitting surface may comprise protrusions, depressions, or a combination thereof, as described above.

Figure 5A:
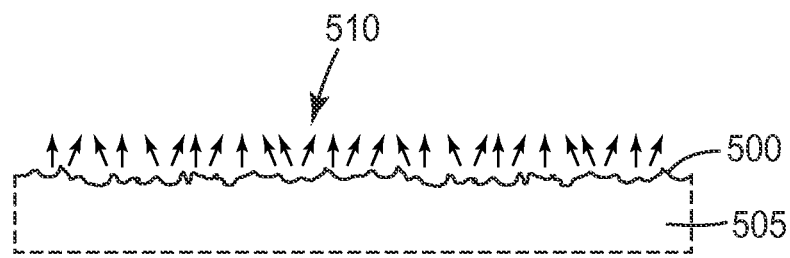
FIGS. 5a-5c show schematic cross sections of exemplary light emitting surfaces.
Figure 5B:
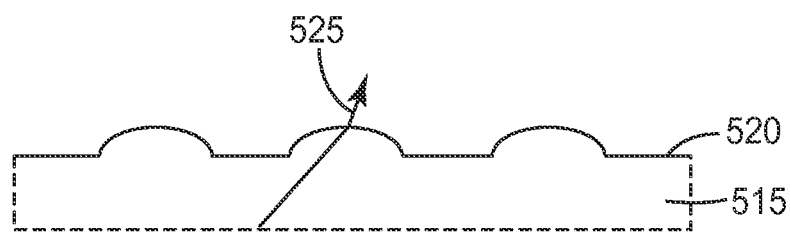
Figure 5C:
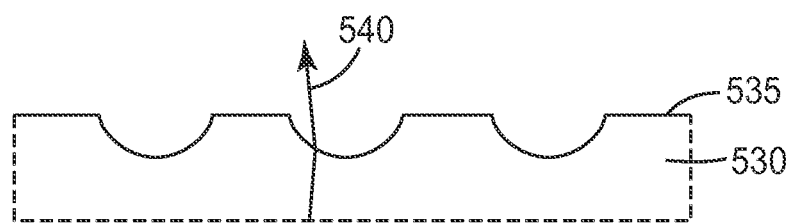

FIGS. 5a-5c show schematic cross sections of exemplary light emitting surfaces that may be used. In FIG. 5a, light emitting layer 505 comprises light emitting surface 500. Surface 500 is irregular such that light represented by rays 510 is diffused upon being emitted from the light emitting layer. In FIG. 5b, light emitting layer 515 comprises light emitting surface 520. Surface 520 comprises discreet convex lenticular features such that light represented by ray 525 is emitted from the light emitting layer at a predetermined direction. In FIG. 5c, light emitting layer 530 comprises light emitting surface 535. Surface 535 comprises discreet concave lenticular features such that light represented by ray 540 is emitted from the light emitting layer at a predetermined direction.

The light emitting surface of the first substrate and the structure of the interface formed between the first substrate and the viscoelastic layer may be the same or different depending on the desired optical effect. They may be configured dependently or independently of each other. The light emitting surface and the interface may both be unstructured. The light emitting surface and the interface may both be irregular. The light emitting surface of the first substrate may be unstructured and the interface formed between the first substrate and the viscoelastic layer may be structured, or vice versa. Various embodiments include: an unstructured light emitting surface and an irregularly structured interface; an irregularly structured light emitting surface and an unstructured interface; an unstructured light emitting surface and an interface structured with lenticular features.

Figure 6A:
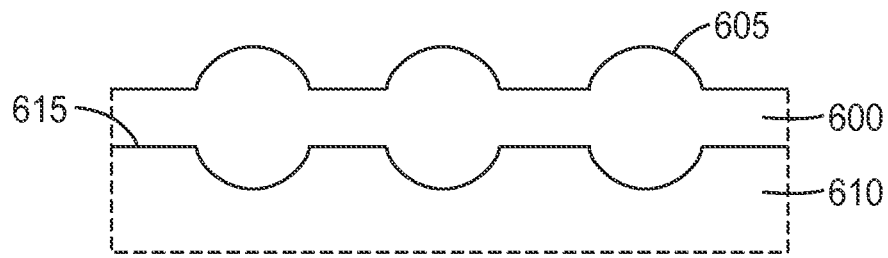
FIGS. 6a-6c show schematic cross sections of exemplary first substrates.
Figure 6B:
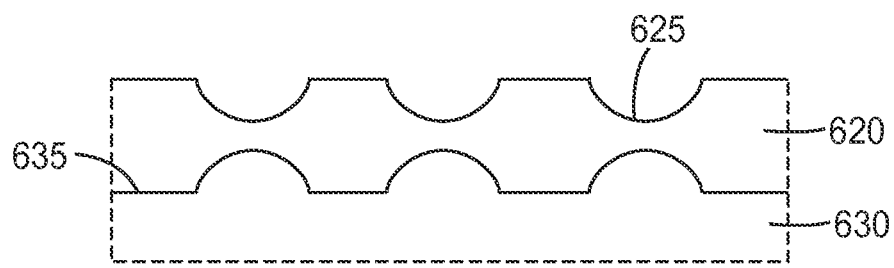
Figure 6C:
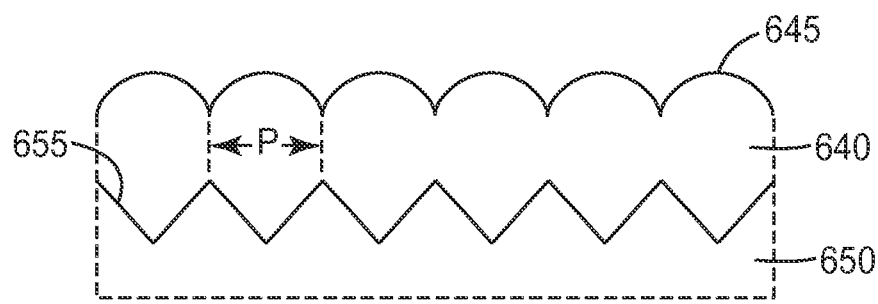

The light emitting surface of the first substrate and the structure of the interface formed between the first substrate and the viscoelastic layer may be configured dependently or independently of each other. FIGS. 6a-6c show schematic cross sections that illustrate how two sets of features can be configured dependently. In FIG. 6a, light emitting layer or first substrate 600 comprises light emitting surface 605 having individual convex lenticular features. Light emitting layer or first substrate 600 and viscoelastic layer 610 form interface 615 having individual concave lenticular features which are aligned or nearly aligned with the individual convex features. In FIG. 6b, light emitting layer or first substrate 620 comprises emitting surface 625 having individual concave lenticular features. Light emitting layer 620 and viscoelastic layer 630 form interface 635 having individual convex lenticular features which are aligned or nearly aligned with the individual concave features.

In FIG. 6c, light emitting layer or first substrate 640 comprises light emitting surface 645 having individual convex lenticular features. Light emitting layer 640 and viscoelastic layer 650 form interface 655 having individual prismatic features. The individual prismatic features may be linear or pyramidal. Pyramidal prismatic features are especially useful in optical display systems. In some embodiments, the period of repetition or pitch P for each set of features is about the same or at least within about 100 um. In some embodiments, the curvature of the individual convex features may be such that their focal points coincide with the vertices of the prisms. Useful configurations of convex lenticular features and prisms are described in U.S. 2005/0052750 A1 (King et al.) and U.S. 2005/0276071 (Sasagawa et al.), both of which are incorporated herein by reference.

The refractive index difference between the first substrate and air may be made by appropriate selection of material. The first substrate may have a refractive index greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, The law of refraction and the principle of total internal reflection can be applied as described above to determine the amount of light emitted from a particular first substrate. For example, the amount of light emitted from the first substrate may be from about 10 to about 50%, from about 20 to about 50%, from about 30 to about 50%, from about 50 to about 70%, from about 50 to about 80%, or from about 10 to about 90% relative to the total amount of light that enters the viscoelastic layer.

The law of refraction and the principle of total internal reflection can be applied as described above to determine the direction of light emitted from the first substrate. For example, the transmittance angle for light emitted from the first substrate may be from greater than about 5° to less than about 95°, greater than about 5° to less than about 60°, or greater than about 5° to less than about 30°.

FIGS. 7-11 show perspective views of exemplary optical articles and how light may be emitted from a light emitting layer or first substrate. Each of the optical articles in these figures is depicted generically as a sheet having a square to rectangular shape. This generic depiction for each figure is for simplicity only and many other various three-dimensional shapes may be contemplated as described below.

Figure 7:
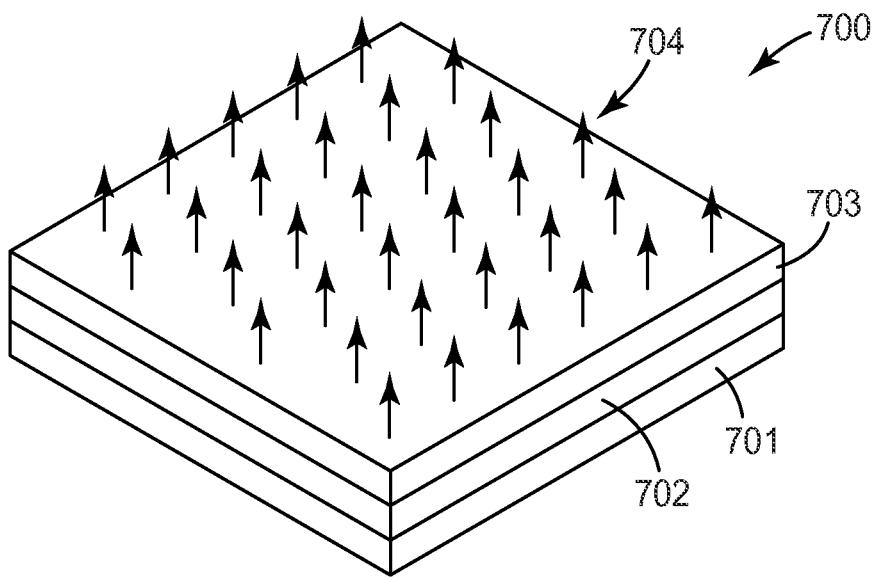
FIGS. 7-11 show schematic perspective views of exemplary optical articles and emission of light therefrom.
Figure 8:
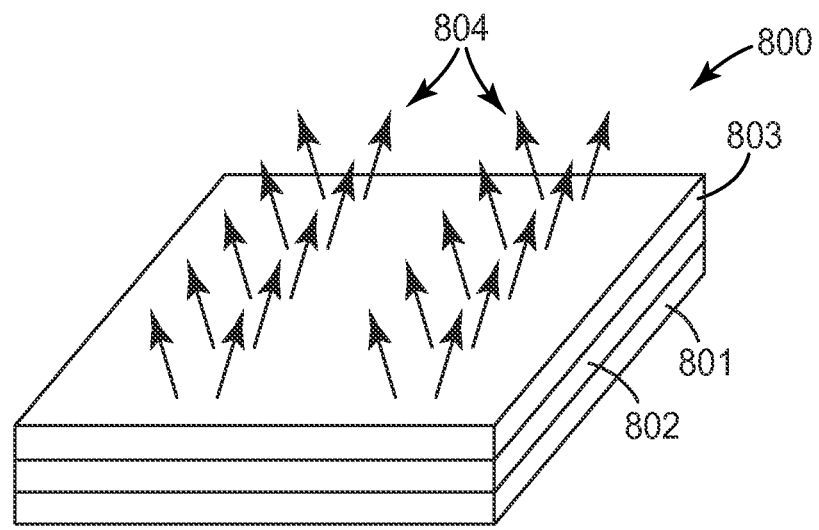

FIG. 7 shows a perspective view of exemplary optical article 700 comprising viscoelastic layer 702 disposed between lightguide 701 and first substrate 703. Light represented by rays 704 is emitted in a predetermined direction from first substrate 703. FIG. 8 shows a perspective view of exemplary optical article 800 comprising viscoelastic layer 802 disposed between lightguide 801 and first substrate 803. Light represented by rays 804 is emitted in two predetermined directions from first substrate 803. Light represented by rays 804 is also emitted in a pattern.

In general, the optical article described herein can be designed such that light may be emitted from the light emitting layer in at least one predetermined direction, e.g., 1, 2, 3, 4, 5, 6, 7, 8, 9, 10, or more predetermined directions; from 1 to about 3 predetermined directions; from 1 to about 5 predetermined directions; from 1 to about 10 predetermined directions; or from 1 to about 100 predetermined directions. The light emitted in at least one predetermined direction may be emitted uniformly (at the same or nearly the same intensity) from the light emitting layer. The light emitted in at least one predetermined direction may be emitted non-uniformly from the light emitting layer. The light emitted in at least one predetermined direction may be emitted at different intensities. The light emitted in at least one predetermined direction may be emitted in a pattern.

Figure 9:
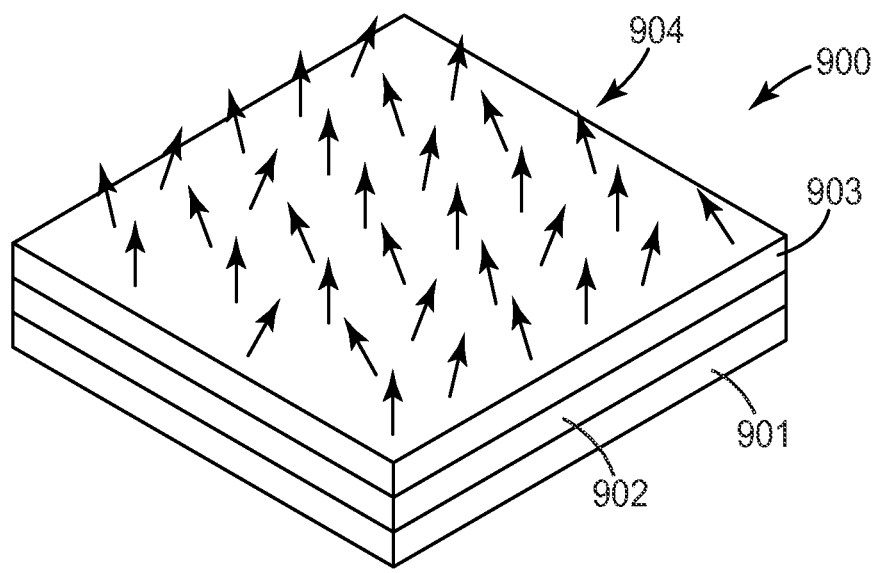

FIG. 9 shows a perspective view of exemplary optical article 900 comprising viscoelastic layer 902 disposed between lightguide 901 and first substrate 903. Light represented by rays 904 is emitted randomly from first substrate 903. In general, the optical article described herein can be designed such that light may be emitted from the light emitting layer in various random directions and/or at various random intensities.

Figure 10:
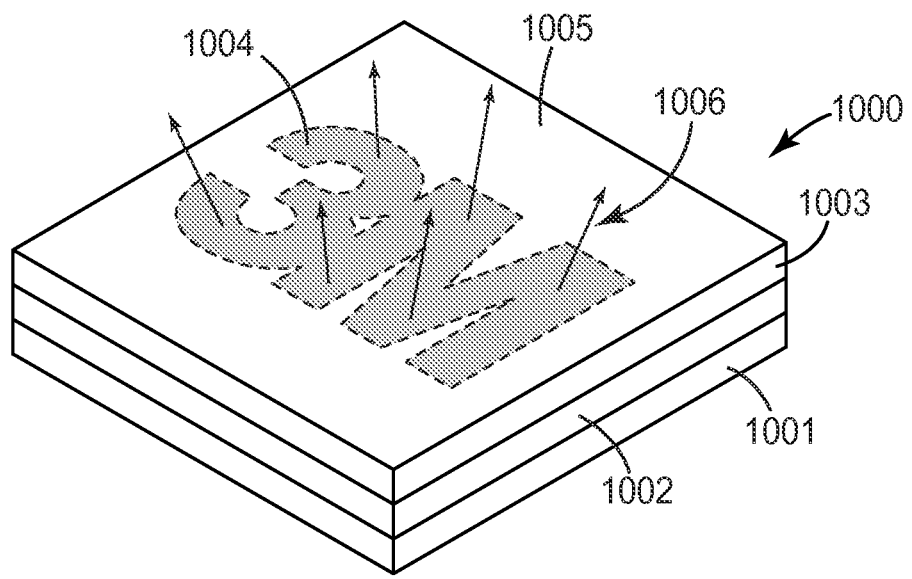

FIG. 10 shows a perspective view of exemplary optical article 1000 comprising viscoelastic layer 1002 disposed between lightguide 1001 and first substrate 1003. Predetermined shape 1004 is shown by a dotted line and shaded area of light emitting surface 1005. Light represented by rays 1006 is emitted such that the predetermined shape is illuminated. In general, the predetermined shape may comprise one or more discrete areas of the light emitting surface. Light may be emitted from one or more discrete areas of the light emitting layer, e.g., 1, 2, 3, 4, 5, 6, 7, 8, 9, 10, or more discrete areas, or from 1 to about 5 discrete areas, from 1 to about 50 discrete areas, or from 1 to about 500 discrete areas. In general, the light emitting surface and the interfaces described above may be structured and/or unstructured such that light is emitted as described for FIG. 10.

Figure 11:
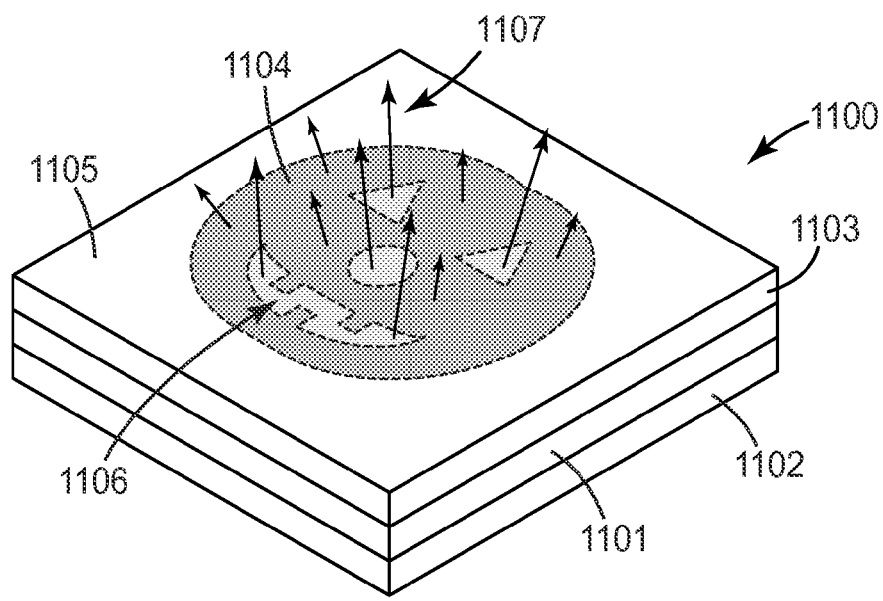

FIG. 11 shows a perspective view of exemplary optical article 1100 comprising viscoelastic layer 1102 disposed between lightguide 1101 and first substrate 1103. Predetermined shape 1104 is shown by a dotted line and shaded area of light emitting surface 1105. Predetermined shapes 1106 within predetermined shape 1104 are shown by dotted lines and lighter shaded areas compared to the shaded area designating predetermined shape 1104. Light represented by rays 1107 is emitted at different intensities: light emitted from predetermined shapes 1106 is emitted at a higher intensity as compared to light emitted from predetermined shape 1104. In particular, higher intensity rays are emitted to form discrete shapes within a larger shape formed by lower intensity rays of one or more intensities. In this way, predetermined shape 1104 is illuminated and predetermined shapes 1106 are illuminated at higher intensities. In general, the light emitting surface and the interfaces described above may be structured and/or unstructured such that light is emitted as described for FIG. 11.

Figure 12:
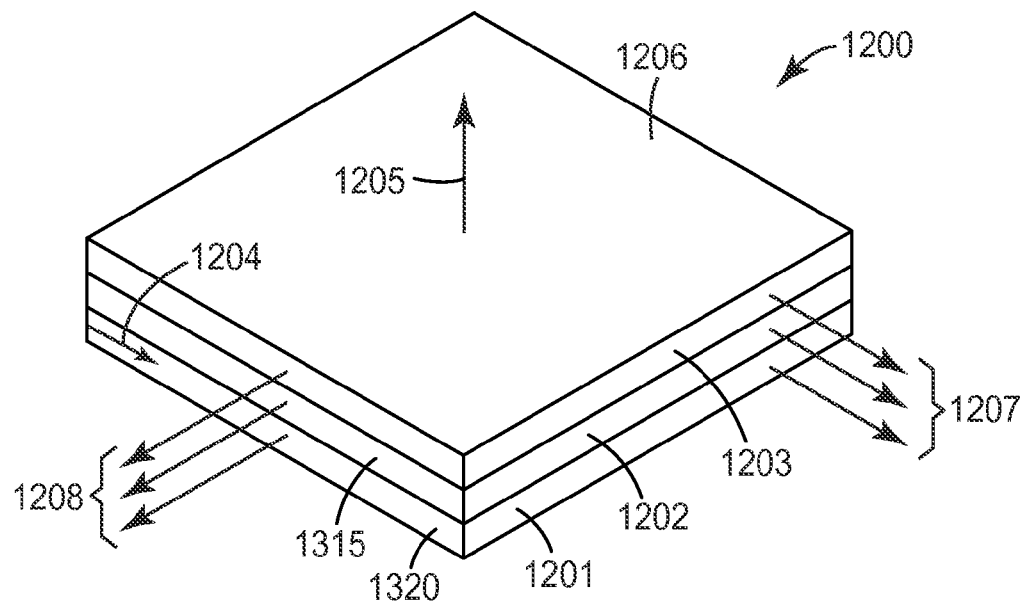
FIG. 12 shows a schematic perspective view of an exemplary optical article and possible ways by which light can be emitted from the articles.

FIG. 12 illustrates generally how light may be emitted from an exemplary optical article shaped as a film or sheet. FIG. 12 shows a perspective view of exemplary optical article 1200 comprising viscoelastic layer 1202 disposed between lightguide 1201 and light emitting layer or first substrate 1203. Lightguide 1201 comprises input edge (not shown) from where light represented by ray 1204 enters the lightguide. Light as shown by ray 1205 may be emitted from major surface 1206 and/or an opposing major surface (not shown). Light may be emitted from any one edge or combination of edges of the three layers (except for the input edge of the lightguide). Light represented by groups of rays 1207 and 1208 show how light may exit the edges of two sides of optical article 1200. Light may also exit from the other two sides (not shown). Light that enters the lightguide may be extracted from a major surface or an edge surface of the lightguide.

Figure 13:
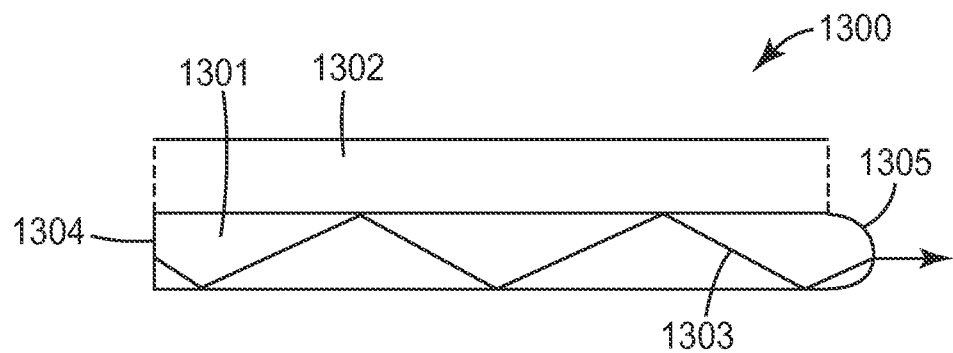
FIGS. 13 and 14 show schematic cross sections of exemplary optical articles.

FIG. 13 shows a schematic cross section of exemplary optical article 1300 comprising viscoelastic layer 1302 disposed on lightguide 1301. Light emitted by a light source (not shown) and represented by ray 1303 enters the lightguide at input edge 1304 and is transported by total internal reflection within the lightguide until it is extracted from opposing edge surface 1305. Light emitted by a light source may also enter the viscoelastic layer at a first surface of the lightguide and be extracted at a second surface, wherein the first and second surfaces are from about 45 to about 135° relative to each other.

Light may be emitted from any one surface or combination of surfaces of the lightguide, the viscoelastic layer, and the first substrate (except for the input edge of the lightguide) regardless of how the optical article is three-dimensionally shaped. Light can be emitted from the edge surfaces by employing structured features, refractive index differences, etc. as described above.

In some embodiments, a surface of the viscoelastic layer is microstructured to form air release channels. For example, as shown in FIG. 2, surface 272 of viscoelastic layer 203 may be microstructured. As used herein, microstructured refers to a surface having one or more features that are microscopic (from about 1 to about 100 um) in at least one dimension. These channels can facilitate air egress so that few air bubbles remain trapped between a viscoelastic layer and a substrate. The microstructured surface with air release channels may be useful with a viscoelastic layer that comprises a PSA. For example, a PSA viscoelastic layer may have a composition and/or surface structure the same or nearly the same as Controltac™ products available from 3M™ Company. In this way, a user can dispose the viscoelastic layer and substrate in some initial position and slide the two relative to each other such that desired positioning is obtained. The microstructure of the microstructured surface may remain and/or change over time. The microstructure may be imparted using a microstructured release liner as described below.

The microstructured surface with air release channels may comprise a variety of shapes including hemispheres, prisms (such as square prisms, rectangular prisms, cylindrical prisms and other similar polygonal features), pyramids, ellipses, grooves (e.g., V-grooves), channels, and the like. Grooves and channels may or may not extend to the edge of a predetermined area. Another exemplary microstructured surface is described in US 2007/0292650 A1 (Suzuki) wherein a microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

The viscoelastic layer is generally in contact with at least one medium. The medium may comprise air or a substrate, and substrates may be polymeric film, metal, glass, and/or fabric. Particular substrates are described below for a variety of exemplary constructions. For the purpose of convenience, a viscoelastic layer in contact with a first substrate is described below, but this first substrate may comprise any type of medium including air.

The lightguide comprises an optically transmissive material, i.e., the lightguide comprises an optically transparent material capable of transmitting light. The refractive index of the lightguide may range from about 1.3 to about 2.6, 1.4 to about 1.7, or from about 1.5 to about 1.7. The particular material used to make the lightguide depends on the required refractive index or range or refractive indices as may be influenced by other design elements of the optical article. For example, the material used to make the lightguide may need to have a refractive index greater than that of the viscoelastic layer.

The lightguide may comprise polymeric material or glass, or some combination thereof. Exemplary polymers that may be used for the lightguide include polycarbonates, poly(meth)acrylates, polystyrenes, polyurethanes, polyesters, polyimides, cyclic olefin copolymers. Particular polymers that may be used for the lightguide include polymethylmethacrylate, polyethyleneterephthalate, polyethylenenaphthalate, bisphenol A polycarbonate, polystyrene, polyvinylacetate, and derivatives thereof. The lightguide may comprise a liquid.

The lightguide may be made from melt-processed or radiation-cured materials.

The lightguide may be a film as described in U.S. Ser. No. 12/199,862 (Sahlin, et al.); U.S. Pat. No. 6,033,604 (Lundin et al.); U.S. 2003/0034445 A1 (Boyd et al.); WO 02/070237 A1 (Lundin); U.S. 2008/232135 A1 (Kinder et al.); U.S. Pat. No. 6,367,941 B2 (Lea et al.); U.S. Pat. No. 6,845,212 B2 (Gardiner et al.); WO 2008/022007 A1 (Vogt et al.) and U.S. Pat. No. 7,046,905 B1 (Gardiner et al.); all incorporated by reference.

The thickness of the lightguide is not particularly limited as long as it can function as desired. The thickness of the lightguide may be selected based on or in conjunction with the light source. For example, design parameters may limit or even require that a particular light source(s) be used, and there may be a minimum amount, or range of amounts, of light that is required to enter the lightguide. Thus, the thickness of the lightguide may be selected so that the required amount of light from a given light source can enter the lightguide. A maximum thickness of the lightguide may be required for use in optical devices designed to be particularly thin. Exemplary thicknesses for the lightguide range from about 0.4 mil to about 1000 mil, from about 1 mil to about 300 mil, from about 1 mil to about 60 mil, or from about 0.5 mil to about 30 mil.

In some embodiments, the lightguide may comprise two layers wherein one of the layers comprises particles. An exemplary optical article comprises a first lightguide, a viscoelastic layer disposed on the first lightguide, a light emitting layer disposed on the viscoelastic layer opposite the first lightguide, and a second lightguide disposed on the first lightguide opposite the viscoelastic layer. The first and second lightguides may comprise the same polymer, or they may comprise different polymers wherein the refractive index difference between the polymers is from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The second lightguide comprises microspheres having a diameter larger than the thickness of the layer. The microspheres may be hollow and comprise glass. In some embodiments, a reflector is disposed on the second lightguide opposite the first lightguide. Useful reflectors are described below. The light emitting layer may comprise a graphic as described below. The two-layer lightguide is described by the beaded retroreflective sheeting references cited below. The construction described in this paragraph may be useful for tail lights.

In some embodiments, the lightguide comprises an input surface adapted to receive light from the light source. The input surface may have a variety of topographies depending on the optical coupling means and/or the particular light source. The input surface may have an appropriate curvature. The input edge comprising the input surface may have a particular cavity, for example a concave hemispherical cavity, to receive a convex lens of a light source. Alternately, the input surface may have refractive structures such as prisms or lenses to optically couple light from the light source into the lightguide.

In some embodiments, an extractor article disposed between the light source and the input edge may be used to facilitate optical coupling with at least some of the light emitted by the light source. Useful extractor articles may have an appropriate curvature for extracting light from the light source. A coupling material for matching refractive indices of the lightguide and some element of the light source may be used. A crosslinkable material may be used for attaching the lightguide to some part of the light source, and subsequently cured using heat and/or light to form the crosslinked material.

The coupling material may comprise silicone gel. The silicone gel may be crosslinked. The silicone gel may be mixed with a silicone oil. The silicone gel may comprise one or more silicone materials such as, for example, dimethylsilicone, diphenylsilicone, or phenylmethylsilicone. The silicone gel may comprise phenylmethylsilicone moieties that are crosslinked. The silicone gel may comprise phenylmethylsilicone moieties which are cross-linked and phenylmethylsilicone oil. The silicone gel may comprise phenylmethylsilicone moieties which are cross-linked and phenylmethylsilicone oil in a weight ratio from 0.2:1 to 5:1. The silicone gel may comprise crosslinked phenylmethylsilicone. Exemplary use of silicone gels is described in U.S. Pat. No. 7,315,418 (DiZio et al.) incorporated herein by reference.

The light source may be optically coupled to the lightguide such that at least some of the light from the light source can enter the lightguide. For example, a light source may be optically coupled to the lightguide such that greater than 1, greater than 10, greater than 20, greater than 30, greater than 40, greater than 50, greater than 90%, or about 100% of light emitted by the light source enters the lightguide. For another example, a light source may be optically coupled to the lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the lightguide. The light source may emit light having a random or a particular angular distribution.

The viscoelastic layer comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic layer may have properties that facilitate sufficient contact or wetting with at least a portion of a substrate such that the viscoelastic layer and the substrate are optically coupled. Light can then be extracted out of the viscoelastic layer and into the substrate. The viscoelastic layer is generally soft, compliant and flexible. Thus, the viscoelastic layer may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic layer comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic layer may have a particular peel force or at least exhibit a peel force within a particular range. For example, the viscoelastic layer may have a 90° peel force of from about 50 to about 3000 g/in, from about 300 to about 3000 g/in, or from about 500 to about 3000 g/in. Peel force may be measured using a peel tester from IMASS. The 90° peel adhesion between the viscoelastic layer and the lightguide may be from about 190 N/m (500 g/in) to about 1160 N/m (3000 g/in).

In some embodiments, the viscoelastic layer comprises an optically clear layer having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic layer has a haze value of less than about 5%, less than about 3%, or less than about 1%. In some embodiments, the viscoelastic layer has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic layer comprises an optically clear layer having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic layer may also have a light transmittance of from about 50 to about 100%.

In some embodiments, the viscoelastic layer is hazy and diffuses light, particularly visible light. A hazy viscoelastic layer may have a haze value of greater than about 5%, greater than about 20%, or greater than about 50%. A hazy viscoelastic layer may have a haze value of from about 5 to about 90%, from about 5 to about 50%, or from about 20 to about 50%.

In some embodiments, the viscoelastic layer may be translucent in that it reflects and transmits light.

The viscoelastic layer may have a refractive index in the range of from about 1.3 to about 2.6, 1.4 to about 1.7, or from about 1.5 to about 1.7. The particular refractive index or range of refractive indices selected for the viscoelastic layer may depend on the overall design of the optical device, e.g., the presence or absence of substrates in contact with the layer and the particular application in which the device may be used.

The viscoelastic layer generally comprises at least one polymer. The polymer may comprise a (meth)acrylate, rubber, silicone, urethane, or a combination thereof. The viscoelastic layer may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs include those based on natural rubbers, synthetic rubbers, styrene block copolymers, (meth)acrylic block copolymers, polyvinyl ethers, polyolefins, and poly(meth) acrylates. As used herein, (meth)acrylic refers to both acrylic and methacrylic species and likewise for (meth)acrylate.

Useful PSAs include (meth)acrylates, rubbers, thermoplastic elastomers, silicones, urethanes, and combinations thereof. In some embodiments, the PSA is based on a (meth) acrylic PSA or at least one poly(meth)acrylate. Herein, (meth)acrylate refers to both acrylate and methacrylate groups. Particularly preferred poly(meth)acrylates are derived from: (A) at least one monoethylenically unsaturated alkyl(meth)acrylate monomer; and (B) at least one monoethylenically unsaturated free-radically copolymerizable reinforcing monomer. The reinforcing monomer has a homopolymer glass transition temperature (Tg) higher than that of the alkyl(meth)acrylate monomer and is one that increases the Tg and cohesive strength of the resultant copolymer. Herein, "copolymer" refers to polymers containing two or more different monomers, including terpolymers, tetrapolymers, etc.

Monomer A, which is a monoethylenically unsaturated alkyl(meth)acrylate, contributes to the flexibility and tack of the copolymer. Preferably, monomer A has a homopolymer Tg of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Benzyl acrylate may also be used. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the Tg and cohesive strength of the copolymer. Preferably, monomer B has a homopolymer Tg of at least about 10° C., for example, from about 10 to about 50° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

In some embodiments, the (meth)acrylate copolymer is formulated to have a resultant Tg of less than about 0° C. and more preferably, less than about −10° C. Such (meth)acrylate copolymers preferably include about 60 to about 98% by weight of at least one monomer A and about 2 to about 40% by weight of at least one monomer B, both relative to the total weight of the (meth)acrylate copolymer. Preferably, the (meth)acrylate copolymer has about 85 to about 98% by weight of at least one monomer A and about 2 to about 15% by weight of at least one monomer B, both relative to the total weight of the (meth)acrylate copolymer.

In some embodiments, the viscoelastic layer comprises a (meth)acrylic pressure sensitive adhesive, the (meth)acrylic pressure sensitive adhesive comprising a first monomer comprising a monoethylenically unsaturated alkyl(meth)acrylate monomer, and a second monomer wherein a homopolymer of the second monomer has a Tg of at least about 10° C.

Useful rubber-based PSAs are generally of two classes, natural rubber-based or synthetic rubber-based. Useful natural rubber-based PSAs generally contain masticated natural rubber, for example, from about 20 to about 75% by weight of one or more tackifying resins, from about 25 to about 80% by weight of natural rubber, and typically from about 0.5 to about 2.0% by weight of one or more antioxidants, all relative to the total weight of the masticated rubber. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon.

Antioxidants may be used with natural rubbers in order to retard oxidative attack on the rubber which can result in loss of cohesive strength of the adhesive. Useful antioxidants include but are not limited to amines, such as N—N' di-beta-naphthyl-1,4-phenylenediamine, available as AGERITE Resin D from R.T. Vanderbilt Co., Inc.; phenolics, such as 2,5-di-(t-amyl)hydroquinone, available as SANTOVAR A, available from Monsanto Chemical Co.; tetrakis[methylene 3-(3',5'-di-tert-butyl-4'-hydroxyphenyl)propianate]methane, available as IRGANOX 1010 from Ciba-Geigy Corp.; 2,2'-methylenebis(4-methyl-6-tert butyl phenol), known as Antioxidant 2246; and dithiocarbamates, such as zinc dithiodibutyl carbamate. Curing agents may be used to at least partially vulcanize (crosslink) the PSA.

Useful synthetic rubber-based PSAs include adhesives that are generally rubbery elastomers, which are either self-tacky or non-tacky and require tackifiers. Self-tacky synthetic rubber PSAs include, for example, butyl rubber, a copolymer of isobutylene with less than 3 percent isoprene, polyisobutylene, a homopolymer of isoprene, polybutadiene, or styrene/butadiene rubber. Butyl rubber PSAs often contain an antioxidant such as zinc dibutyl dithiocarbamate. Polyisobutylene PSAs do not usually contain antioxidants. Synthetic rubber PSAs, which generally require tackifiers, are also generally easier to melt process as compared to natural rubber PSAs which typically having very high molecular weights. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich. Tackifiers that may be used with synthetic rubber PSAs include derivatives of rosins such as FORAL 85, a stabilized rosin ester from Hercules, Inc.; the SNOWTACK series of gum rosins from Tenneco; the AQUATAC series of tall oil rosins from Sylvachem; synthetic hydrocarbon resins such as the PICCOLYTE A series, polyterpenes from Hercules, Inc.; the ESCOREZ 1300 series of C5 aliphatic olefin-derived resins; and the ESCOREZ 2000 Series of C9 aromatic/aliphatic olefin-derived resins. Curing agents may be added to at least partially vulcanize (crosslink) the PSA.

Useful thermoplastic elastomer PSAs include styrene block copolymer PSAs which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer PSAs include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer PSAs to have two phase structures.

Resins that associate with the rubber phase may be used with thermoplastic elastomer PSAs if the elastomer itself is not tacky enough. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc.

Resins that associate with the thermoplastic phase may be used with thermoplastic elastomer PSAs if the elastomer is not stiff enough. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCOVAR 130 alkyl aromatic polyindene resin, available from Hercules, Inc., and the PICCOTEX series of alphamethyl styrene/vinyl toluene resins, available from Hercules.

Useful silicone PSAs include polydiorganosiloxanes and polydiorganosiloxane polyoxamides. Useful silicone PSAs include silicone-containing resins formed from a hyrosilylation reaction between one or more components having silicon-bonded hydrogen and aliphatic unsaturation. Examples of silicon-bonded hydrogen components include high molecular weight polydimethylsiloxane or polydimethyldiphenylsiloxane, and that contain residual silanol functionality (SiOH) on the ends of the polymer chain. Examples of aliphatic unsaturation components include siloxanes functionalized with two or more (meth)acrylate groups or block copolymers comprising polydiorganosiloxane soft segments and urea terminated hard segments. Hydrosilylation may be carried out using platinum catalysts.

Useful silicone PSAs may comprise a polymer or gum and an optional tackifying resin. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone PSAs is described in U.S. Pat. No. 2,736,721 (Dexter). Manufacture of silicone urea block copolymer PSAs is described in U.S. Pat. No. 5,214,119 (Leir, et al).

Useful silicone PSAs may also comprise a polydiorganosiloxane polyoxamide and an optional tackifier as described in U.S. Pat. No. 7,361,474 (Sherman et al.) incorporated herein by reference. For example, the polydiorganosiloxane polyoxamide may comprise at least two repeat units of Formula I:

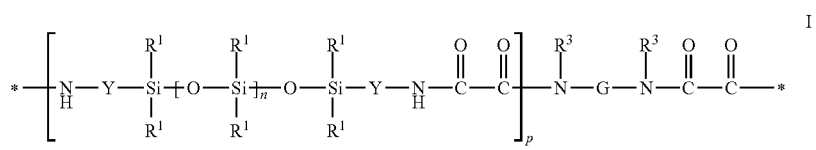

wherein: each $R^1$ is independently an alkyl, haloalkyl, aralkyl, alkenyl, aryl, or aryl substituted with an alkyl, alkoxy, or halo, wherein at least 50 percent of the $R^1$ groups are methyl; each Y is independently an alkylene, aralkylene, or a combination thereof; G is a divalent residue equal to a diamine of formula $R^3$HN-G-NHR$^3$ minus the two —NHR$^3$ groups; $R^3$ is hydrogen or alkyl or $R^3$ taken together with G and with the nitrogen to which they are both attached forms a heterocyclic group; n is independently an integer of 40 to 1500; and p is an integer of 1 to 10; and an asterisk (*) indicates a site of attachment of the repeat unit to another group in the copolymer. The copolymer may have a first repeat unit where p is equal to 1 and a second repeat unit where p is at least 2. G may comprise an alkylene, heteroalkylene, arylene, aralkylene, polydiorganosiloxane, or a combination thereof. The integer n may be an integer of 40 to 500. These polydiorganosiloxane polyoxamides can be used in combination with a tackifier. Useful tackifiers include silicone tackifying resins as described in U.S. Pat. No. 7,090,922

B2 (Zhou et al.) incorporated herein by reference. Some of these silicone-containing PSAs may be heat activated.

The PSA may be crosslinked to the extent that the crosslinks do not interfere with desired properties of the viscoelastic layer. Generally, the PSA may be crosslinked to the extent that the crosslinks do not interfere with the viscous characteristics of the viscoelastic layer. Crosslinking is used to build molecular weight and strength of the PSA. The degree of crosslinking may be selected based upon the application for which the layer is intended. Crosslinking agents may be used to form chemical crosslinks, physical crosslinks or a combination thereof. Chemical crosslinks include covalent bonds and ionic bonds. Covalent crosslinks may be formed by incorporating a multi-functional monomer in the polymerization process, followed by curing using, e.g., ultraviolet radiation, heat, ionizing radiation, moisture, or a combination thereof.

Physical crosslinks include noncovalent bonds and are generally thermally reversible. Examples of physical crosslinks include high Tg (i.e., those having a Tg higher than room temperature, preferably higher than 70° C.) polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows. Hard segments include the styrene macromers of U.S. Pat. No. 4,554,324 (Husman et al.) incorporated herein by reference and/or acid/base interactions (i.e., those involving functional groups within the same polymer or between polymers or between a polymer and an additive) such as polymeric ionic crosslinking as described in WO 99/42536 (Stark et al.).

Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of from about 250 to about 400 nm), causes the copolymer to crosslink. The crosslinking agent is used in an effective amount, by which is meant an amount that is sufficient to cause crosslinking of the PSA to provide adequate cohesive strength to produce the desired final adhesion properties. Preferably, the crosslinking agent is used in an amount of about 0.1 part to about 10 parts by weight, based on the total weight of monomers.

In some embodiments, the viscoelastic layer comprises a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl(meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic layer comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic layer comprises a PSA formed from at least one monomer containing a substituted or an unsubstituted aromatic moiety as described in U.S. Pat. No. 6,663,978 B1 (Olson et al.):

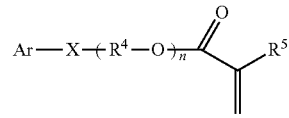

wherein Ar is an aromatic group which is unsubstituted or substituted with a substituent selected from the group consisting of $Br_y$ and $R^6{}_z$ wherein y represents the number of bromine substituents attached to the aromatic group and is an integer of from 0 to 3, $R^6$ is a straight or branched alkyl of from 2 to 12 carbons, and z represents the number of $R^6$ substituents attached to the aromatic ring and is either 0 or 1 provided that both y and z are not zero; X is either O or S; n is from 0 to 3; $R^4$ is an unsubstituted straight or branched alkyl linking group of from 2 to 12 carbons; and $R^5$ is either H or $CH_3$.

In some embodiments, the viscoelastic layer comprises a copolymer as described in U.S. Ser. No. 11/875,194 (Determan et al.), comprising (a) monomer units having pendant bephenyl groups and (b) alkyl(meth)acrylate monomer units.

In some embodiments, the viscoelastic layer comprises a copolymer as described in U.S. Provisional Application Ser. No. 60/983,735 (Determan et al.), comprising (a) monomer units having pendant carbazole groups and (b) alkyl (meth) acrylate monomer units.

In some embodiments, the viscoelastic layer comprises an adhesive as described in U.S. Provisional Application Ser. No. 60/986,298 (Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl(meth)acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic layer may comprise a stretch releasable PSA. Stretch releasable PSAs are PSAs that can be removed from a substrate if they are stretched at or nearly at a zero degree angle. In some embodiments, the viscoelastic layer or a stretch release PSA used in the viscoelastic layer has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or U.S. Provisional Application Nos. 61/020,423 (Sherman et al.) and 61/036,501 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof. If a stretchable PSA is used, then the layer can be selectively stretched so that light is then extracted.

The viscoelastic layer may comprise an aerogel. An aerogel is a low-density solid state material derived from gel in which the liquid component of the gel has been replaced with air. Silica, alumina and carbon aerogels are exemplary aerogels that may be used.

The viscoelastic layer can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic layer may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic layer by incorporating bubbles into the layer. The bubbles may have a diameter of from about 0.01 to about 1 um. Bubbles may be introduced by adding, e.g., foaming agents. Examples of additional additives that may be added to the viscoelastic layer include glass beads, reflective particles, and conductive particles. In some embodiments, the viscoelastic layer may comprise a PSA matrix and particles as described in U.S. Provisional Application No. 61/097,685 (Sherman et al.), comprising an optically clear PSA and silicon resin particles having a refractive index less than that of the PSA, and incorporated herein by reference. In some embodiments, the presence of particles, bubbles, air, etc. increases the scatter and uniformity of light.

The thickness of the viscoelastic layer is not particularly limited as long as the optical article can function as desired. The thickness of the viscoelastic layer may be selected based on or in conjunction with the layer, the light emitting layer, and/or the light source. The thickness of the viscoelastic layer may be limited by the overall thickness of the article in which the optical article is used. The thickness of the viscoelastic layer may range from about 0.4 mil to about 1000 mil, from about 1 mil to about 300 mil, or from about 1 mil to about 60 mil.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic layer. The light source may comprise LEDs arranged on a circuit such that light emitted from the LEDs lights up continuously or uniformly the viscoelastic layer throughout a desired area. The light source may comprise LEDs that emit light of different colors such that the colors can mix within the viscoelastic layer. In this way, a graphic could be designed to appear differently at different times during its use. The light source may or may not contact the lightguide.

The light source may be powered by any suitable means. The light source may be powered using a battery, a DC power supply, an AC to DC power supply, an AC power supply, or a solar photovoltaic cell.

The optical article comprising the lightguide and the viscoelastic layer can be used in a variety of multilayer constructions depending on the particular application. Some of these embodiments are described herein. In general, a first substrate may be disposed on the viscoelastic layer opposite the lightguide.

In some embodiments, the first substrate comprises an optically clear substrate having high light transmittance of from about 80 to about 100%, from about 90 to about 100%, from about 95 to about 100%, or from about 98 to about 100% over at least a portion of the visible light spectrum. In some embodiments, the first substrate has a haze value of less than about 5%, less than about 3%, or less than about 1%. In some embodiments, the first substrate has a haze value of from about 0.01 to less than about 5%, from about 0.01 to less than about 3%, or from about 0.01 to less than about 1%.

In some embodiments, the first substrate comprises an optically clear substrate having high light transmittance and a low haze value. High light transmittance may be from about 90 to about 100%, from about 95 to about 100%, or from about 98 to about 100% over at least a portion of the visible light spectrum, and haze values may be from about 0.01 to less than about 5%, from about 0.01 to less than about 3%, or from about 0.01 to less than about 1%. In some embodiments, the first substrate is hazy and diffuses light, particularly visible light. A hazy first substrate may have a haze value of greater than about 5%, greater than about 20%, or greater than about 50%. A hazy first substrate may have a haze value of from about 5 to about 90%, from about 5 to about 50%, or from about 20 to about 50%.

In some embodiments, the first substrate has low light transmittance, for example, from about 0.1 to about 70%, from about 0.1 to about 50%, or from about 0.1 to about 20%.

In some embodiments, the first substrate may be translucent in that it reflects and transmits light.

The first substrate may have a refractive index in the range of from about 1.3 to about 2.6, 1.4 to about 1.7, or from about 1.5 to about 1.7. The particular refractive index or range of refractive indices selected for the first substrate may depend on the overall design of the optical article or device, e.g., the presence or absence of any additional substrates in contact with the first substrate and the particular application in which the article or device may be used.

In some embodiments, the first substrate comprises one or more viscoelastic materials as described above for the viscoelastic layer. In some embodiments, the first substrate comprises a PSA as described above for the viscoelastic layer. In some embodiments, the first substrate and the viscoelastic layer comprise viscoelastic materials. In some embodiments, the first substrate and the viscoelastic layer comprise PSAs.

In some embodiments, the first substrate comprises an adhesive that is useful for adhering the optical article or device to an article such as a dashboard of a vehicle or a painted wall. Useful adhesives include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as 3M™ SCOTCH-WELD™ Adhesives.

In some embodiments, the first substrate is not viscoelastic.

In some embodiments, the first substrate comprises a polymer. In some embodiments, the first substrate comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the first substrate comprises a poly(meth)acrylate having a refractive index greater than that of the viscoelastic layer.

A translucent light emitting layer may comprise prismatic retroreflective sheeting, also known as cube corner sheeting and truncated cube corner sheeting. Prismatic retroreflective sheeting typically comprises a thin transparent layer having a substantially planar first surface and a second structured surface comprising a plurality of geometric structures, some or all of which include three reflective faces configured as a cube corner element. Exemplary prismatic retroreflective sheeting is described in U.S. Provisional Application No. 61/107,586 filed on Oct. 22, 2008 (Smith et al.); U.S. 2007/0242356 A1 (Thakkar et al.); U.S. Pat. No. 6,280,822 B1 (Smith et al.); and U.S. Pat. No. 5,784,197 (Frey et al.); all of which are incorporated herein by reference including references cited therein. Exemplary prismatic retroreflective sheeting is available as 3M™ Diamond Grade™ Reflective Sheeting and 3M™ Diamond Grade™ Fluorescent Reflective Sheeting, both from 3M™ Company.

A translucent light emitting layer may comprise beaded retroreflective sheeting comprising microspheres typically at least partially embedded in a binder layer and having associated specular or diffuse reflecting materials to retroreflect incident light. Exemplary beaded retroreflective sheeting is described in U.S. 2007/0110960 A1 (Frey et al.); U.S. Pat. No. 7,140,741 B2 (Fleming et al.); U.S. Pat. No. 5,066,098 (Kult et al.); EP 0 291 206 A1 (Kult et al.); WO 2007/075518 A1; and WO 2008/060731 A2 (Ko et al.); all of which are incorporated herein by reference including references cited therein.

Retroreflective sheeting described above, and in general, may be disposed on the viscoelastic layer such that either side/surface of the sheeting is adjacent the viscoelastic layer. These two constructions are referred to herein as "front lit" and "back lit".

In some constructions, the reflective side of the retroreflective sheeting is adjacent the viscoelastic layer, and a layer of an optically transmissive film such as polymethylmethacrylate (for protection) is disposed on the opposite side of the viscoelastic layer. A reflector such as a specular reflector is disposed on the retroreflective sheeting opposite the viscoelastic layer.

In some constructions, the side of the reflective film opposite the reflective side is adjacent the viscoelastic layer. A reflector may be disposed on the viscoelastic layer opposite the retroreflective sheeting. This particular construction may also be directly adhered to a substrate such as a vehicle, etc. (a substrate instead of the reflector).

The thickness of the light emitting layer is not particularly limited as long as the optical article can function as desired. The thickness of the light emitting layer may be selected based on or in conjunction with the viscoelastic layer, the lightguide, and/or the light source with which the optical article is used. The thickness of the light emitting layer may be limited by the overall thickness of the article in which the optical article is used. The thickness of the light emitting layer may range from about 0.4 mil to about 1000 mil, from about 1 mil to about 300 mil, or from about 1 mil to about 60 mil.

The first substrate may comprise a polymer, metal, glass, ceramic, release liner, a graphic, paper, fabric, grease, antiseptic gel, or a combination thereof. The first substrate may comprise a multilayer optical film, a reflector, a mirror, a polarizer, a prismatic film, a three-quarter polarizer, a retroreflective film or a combination thereof. The first substrate may emit light extracted from the viscoelastic layer. At least about 50% of light extracted from the viscoelastic layer may be emitted from the first substrate. An interface formed between the first substrate and the viscoelastic layer may comprise a plurality of features oriented to extract light from the viscoelastic layer. A surface of the first substrate may comprise a plurality of features oriented to emit light from the first substrate. The first substrate may comprise an imaged polymeric film. Light may be emitted uniformly, in one or more predetermined directions, or at different intensities from the first substrate. The first substrate may not emit light.

The optical article may have any overall three-dimensional shape. As used herein, an overall three-dimensional shape refers to the size and shape of the article or layer without taking into account any light extracting and/or light emitting features on the surface of the article or layer, respectively. For example, as shown in FIG. 2, optical article 200 may have an overall rectangular shape when viewed as a schematic cross section. The optical article may or may not be dependent on the particular application in which the article will be used. For example, if the optical article is used as a sign, then the overall three-dimensional shape of the optical article layer may be that of a layer or sheet. Other exemplary shapes of the optical article are described below.

The same or different optical articles may be tiled or quilted together.

The lightguide may have any overall three-dimensional shape. For example, in FIG. 2, the lightguide when viewed as a schematic cross section has an overall rectangular shape. In general, the lightguide may have any overall three-dimensional shape which may be dependent on the particular application in which the optical article will be used. For example, if the optical article is used as a sign, then the overall three-dimensional shape of the lightguide may be that of a layer or sheet. Other exemplary shapes of the lightguide are described below for particular applications.

The viscoelastic layer and the light emitting layer may also have any overall three-dimensional shapes. These layers may be the same size or nearly the same size as the lightguide, they may be different sizes where one of the layers is the same size as the lightguide. Each of the lightguide, viscoelastic layer, and the light emitting layer may have a different size. Again, other exemplary shapes of the lightguide, the viscoelastic layer, and the light emitting layer are described below for particular applications. Exemplary three-dimensional shapes of the optical article are also described below for particular applications.

Figure 14:
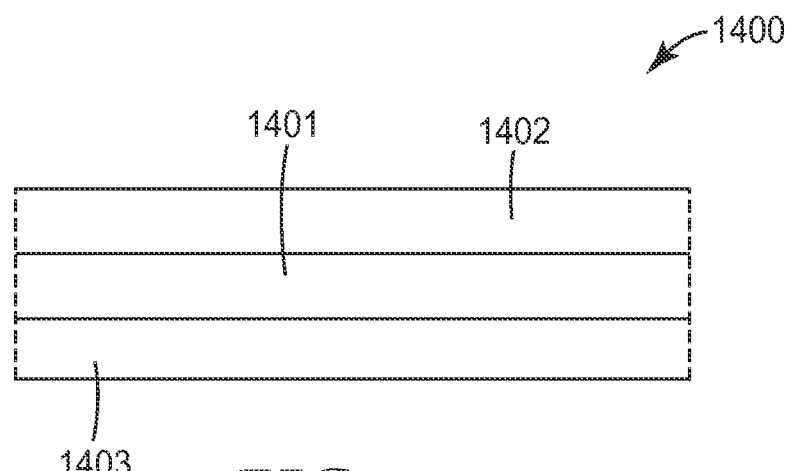

The optical article disclosed herein may further comprise a second substrate disposed on the lightguide opposite the viscoelastic layer. FIG. 14 shows a schematic cross section of exemplary optical article 1400 comprising viscoelastic layer 1402 disposed on lightguide 1401. Second substrate 1403 is disposed on lightguide 1401 opposite the viscoelastic layer.

The second substrate may be a reflector that reflects incident light being transported within the lightguide. In some embodiments, the reflector comprises a specular reflector wherein light propagating within the lightguide is reflected at a surface of the specular reflector according to the law of reflection. The law of reflection states that for light incident upon a surface and reflected by the surface, the reflection angle, $\theta_r$, is the same as or nearly the same as the incident angle, $\theta_i$, wherein both angles are defined relative to a plane of the surface. For a specular reflector, the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

In some embodiments, the reflector comprises a diffuse reflector wherein light propagating within the lightguide is reflected and scattered at a surface of the diffuse reflector. For a diffuse reflector, light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co. The particles may be dispersed in a polymeric material or binder. Binders include one or more polymers and may be, for example, any of the viscoelastic materials and adhesive materials (cold seal adhesives, etc.) described above. The binder may comprise a PSA. The binder and particles may be coated onto a substrate such that the thickness of the binder is greater than, less than or about the same as the diameter of the particles. The substrate may comprise a polymer, metal, specular reflector, and the like.

For example, the diffuse reflector may comprise a layer of barium sulfate particles loaded in a polyethylene terephalate film. Other constructions that provide a reflective surface are described in U.S. Pat. No. 7,481,563 (David et al.) incorporated herein by reference.

In some embodiments, the binder is light transmissive such that at least some of the light incident upon the layer enters the layer and becomes diffused. This diffused light is reflected upon being incident on a substrate that is a reflector. The diffusive material may comprise particles dispersed in a binder as described above. The refractive indices of the particles and binder may be different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.) incorporated herein by reference. For example, the particles may comprise hollow glass spheres having a mean diameter of about 18 um (SPHERICEL Grade 60P18 from Potters Industries Inc.), and the binder may comprise a PSA such as a silicone PSA.

In some embodiments, the first substrate comprises a multilayer optical film. Multilayer optical films that are mirrors are described above. Other types of multilayer optical films may also be used, for example, the multilayer optical film may be a reflective film, a polarizer film, a reflective polarizer film, a diffuse blend reflective polarizer film, a diffuser film, a brightness enhancing film, a turning film, a mirror film, or a combination thereof. Exemplary multilayer optical films include 3M™ Vikuiti™ films available from 3M™ Company. Exemplary multilayer optical films are described in the references cited above for multilayer optical films that are mirrors.

In some embodiments, the first substrate comprises a polymeric film, metal, glass, ceramic, paper, fabric, or a combination thereof. In some embodiments, the first substrate comprises metal such as aluminum. In some embodiments, the first substrate comprises glass which generally comprises a hard, brittle, amorphous solid, including, soda-lime glass, borosilicate glass, acrylic glass, sugar glass, and the like. In some embodiments, the first substrate comprises a ceramic comprising some amount of crystalline structure and made, for example, from inorganic non-metallic materials. In some embodiments, the first substrate comprises paper, for example, paper made from cellulose pulp. In some embodiments, the first substrate comprises fabric, for example, leather, woven fabrics, non-woven fabrics.

In some embodiments, the second substrate comprises an adhesive layer so that the optical article can be adhered to a variety of surfaces for different applications as described herein. Suitable adhesives include optically clear PSAs, optically diffuse PSAs such as those described above, radiation cured adhesives, hot melt adhesives, cold seal adhesives, heat activated adhesives, structural adhesives having an adhesive bond strength of at least about 6 MPa, and the like. An adhesive layer may be used to adhere another substrate onto the lightguide, for example, an adhesive layer may be used to adhere a reflector to the lightguide.

In some embodiments, the second substrate comprises a reflector, and a third substrate is disposed on the reflector opposite the lightguide. The optical article can then be adhered to a variety of substrates for different applications as described herein. Suitable adhesives include any of those described herein. A release liner as described below may be disposed on this adhesive layer and removed before application to the substrate.

The optical article may further comprise a third substrate disposed on the lightguide opposite the viscoelastic layer, wherein the third substrate comprises a multilayer optical film, a reflector, a mirror, a polarizer, a prismatic film, a three-quarter polarizer, a retroreflective film, polymer, metal, glass, ceramic, a graphic, paper, fabric or a combination thereof. An adhesive layer may be disposed on the third substrate opposite the lightguide. The third substrate may emit light extracted from the lightguide. At least about 50% of light extracted from the lightguide may be emitted from the third substrate. Less than about 10% of light that enters the lightguide may be extracted from the lightguide and into the third substrate. An interface formed between the lightguide and the third substrate may comprise a plurality of features oriented to extract light from the lightguide. A surface of the third substrate may comprise a plurality of features oriented to emit light from the third substrate. The third substrate may comprise an imaged polymeric film. Light may be emitted uniformly, in one or more predetermined directions, or at different intensities from the third substrate. The third substrate may not emit light.

A release liner may be disposed on the viscoelastic layer opposite the lightguide. The release liner can be removed at any time to expose the viscoelastic layer. Exemplary release liners have a low adhesion surface for contact with the adhesive layer. Release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. Exemplary release liners include liners commercially available from CP Films Inc. under the trade designations "T-30" and "T-10" that have a silicone release coating on polyethylene terephthalate film. Exemplary release liners include structured release liners such as those which are microstructured. Microstructured release liners are used to impart a microstructure on the surface of an adhesive layer such as the microstructured surface described above for forming air release channels.

Figure 15A:
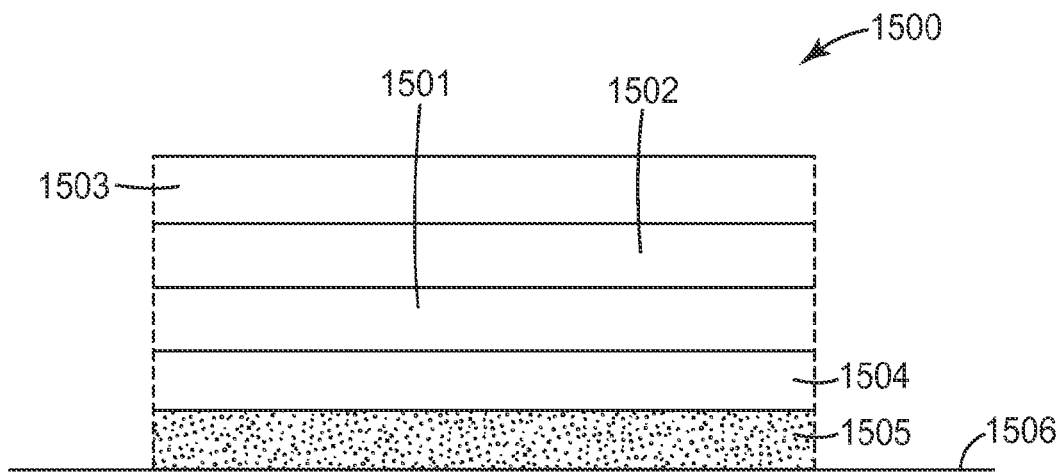
FIGS. 15a and 15b show schematic cross sections of exemplary optical articles disposed on different substrates.
Figure 15B:
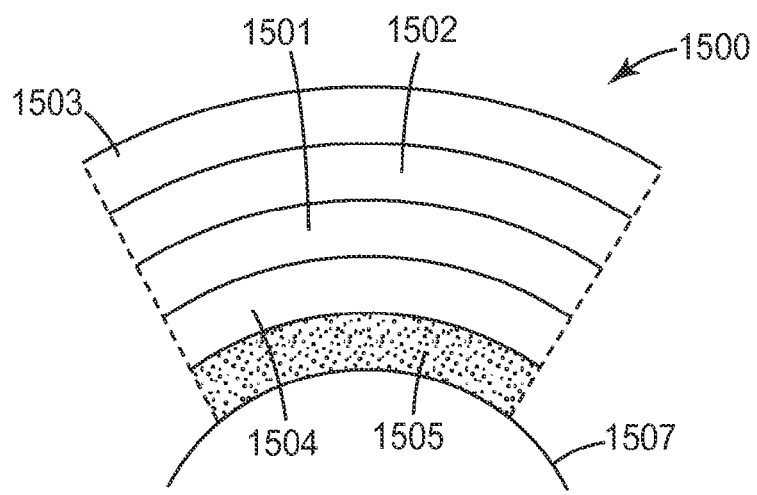

The optical device and article disclosed herein may be flexible. FIGS. 15a and 15b show schematic cross sections of exemplary optical article 1500 disposed on generally flat substrate 1506 and relatively curved substrate 1507, respectively. Exemplary optical article 1500 comprises viscoelastic layer 1502 disposed between lightguide 1501 and light emitting layer or first substrate 1503. Exemplary optical article 1500 further comprises reflector 1504 disposed on lightguide 1501 opposite viscoelastic layer 1502. Adhesive layer 1505 is disposed on reflector 1504 opposite the lightguide. Exemplary optical article 1500 can be adhered to a variety of substrates as described below.

Useful adhesives that may be used for adhesive layer 1505 include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as 3M™ SCOTCH-WELD™ Adhesives.

Optical article 1500 may further comprise a release liner disposed on adhesive layer 1505 and that is removed prior to adhering the article to a substrate. Useful release liners include any of those described above for the first substrate.

Figure 16A:
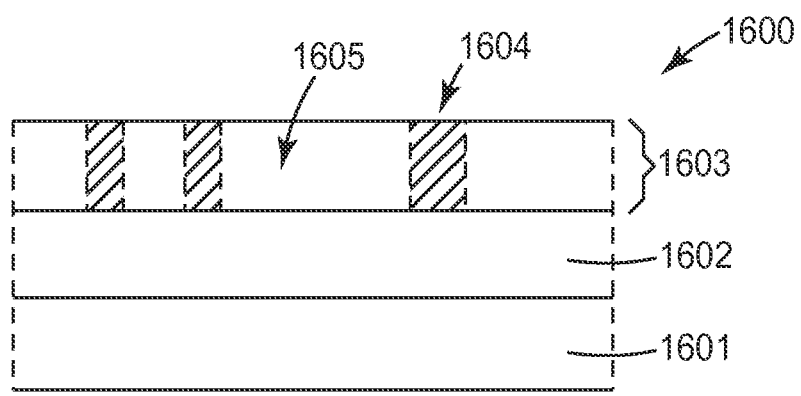
FIGS. 16a-16e show schematic cross sections of exemplary optical articles that can provide an image.

The optical article may provide an image. In some embodiments, the viscoelastic layer provides the image. In some embodiments, the first substrate provides the image. An image may be made by including or embedding different materials such as particles in regions of the first substrate wherein the regions are arranged to form an image. FIG. 16a shows a schematic cross section of exemplary optical article 1600 that may be used to provide an image. Exemplary optical article 1600 comprises viscoelastic layer 1602 disposed between lightguide 1601 and first substrate 1603. The first substrate comprises two different materials used to form regions 1604 and 1605 which are arranged to form the image. Light behaves differently upon striking the interface between the viscoelastic layer and the first substrate, depending on whether the interface is formed between the viscoelastic layer and region 1604 or 1605. For example, light incident upon an interface with region 1604 may be reflected, and light incident upon an interface with region 1605 may be extracted. For another example, light incident upon an interface with region 1605 may be reflected, and light incident upon an interface with region 1604 may be extracted selectively for light within a particular range of wavelengths. Viscoelastic layer 1602 may comprise imaging materials instead of or in combination with first substrate 1603.

Figure 16B:
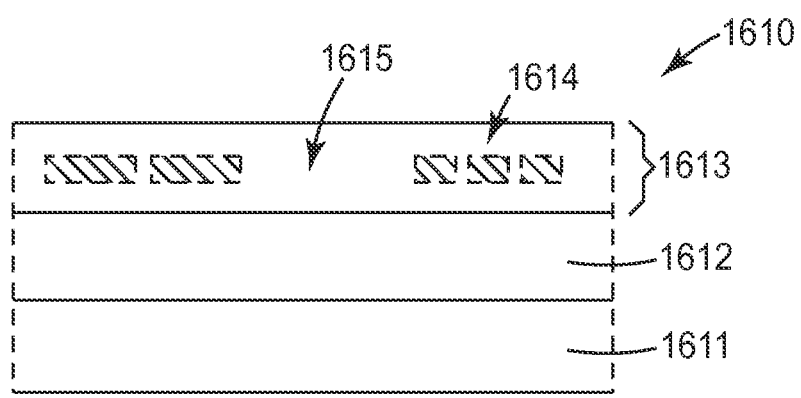

FIG. 16b shows a schematic cross section of exemplary optical article 1610 that may be used to provide an image. Exemplary optical article 1610 comprises viscoelastic layer 1612 disposed between lightguide 1611 and first substrate 1613. The first substrate comprises two different materials used to form regions 1614 and bulk material 1615, with regions 1614 comprising material suspended in bulk material 1615. Light propagating within the viscoelastic layer may be extracted by bulk material 1615. Regions 1614 may reflect light or transmit light within a particular range of wavelengths depending on the particular materials. Colorants such as pigments and dyes may be used for regions 1614. Viscoelastic layer 1612 may comprise imaging materials instead of or in combination with first substrate 1613.

Figure 16C:
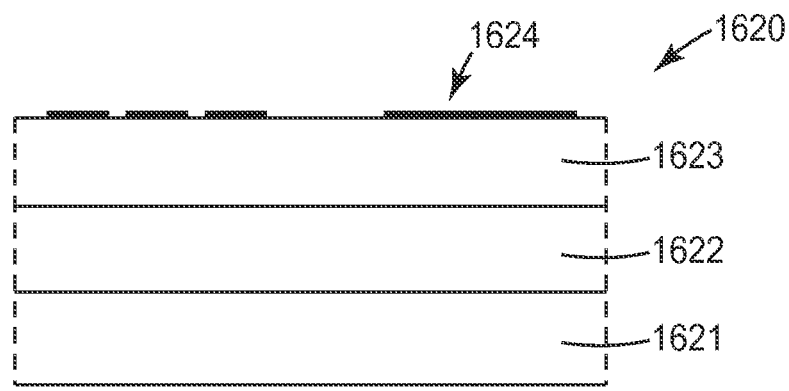

An image may be made by depositing material on a surface of the first substrate wherein the material is arranged to form the image. FIG. 16c shows a schematic cross section of exemplary optical article 1620 that may be used to provide an image. Exemplary optical article 1620 comprises viscoelastic layer 1622 disposed between lightguide 1621 and first substrate 1623. Material 1624 is deposited onto the first substrate such that an image is formed by reflection of light within the first substrate and/or transmission of light within a particular range of wavelengths.

Figure 16D:
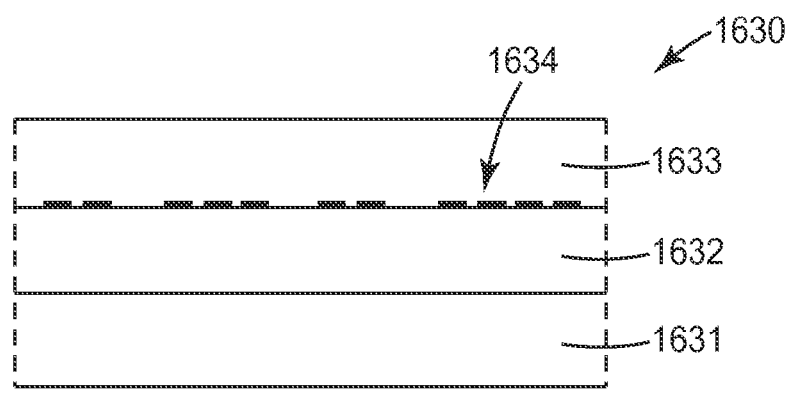

An image may be made by depositing material between the first substrate and the viscoelastic layer wherein the material is arranged to form the image. FIG. 16d shows a schematic cross section of exemplary optical article 1630 comprising viscoelastic layer 1632 disposed between lightguide 1631 and first substrate 1633. Material 1634 is deposited between the lightguide and the first substrate such that an image is formed by reflection of light within viscoelastic layer 1631 and/or extraction of light into first substrate 1633 wherein the extracted light may be within a particular range of wavelengths.

Figure 16E:
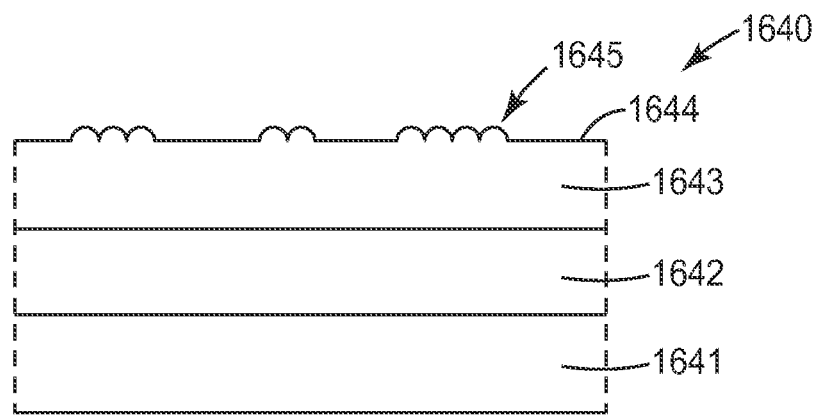

An image may be made by structuring, as described above, a surface of the optical article such as surface 1005 of optical article 1000 shown in FIG. 10. FIG. 16e shows a schematic cross section of exemplary optical article 1640 comprising viscoelastic layer 1642 disposed between lightguide 1641 and first substrate 1643. Surface 1644 of the first substrate comprises lenticular features 1645 which are arranged to provide an image. Any of the features described above may be used to provide an image. The interface between the viscoelastic layer and the first substrate may be structured to provide an image.

The optical article may provide an image by having a graphic placed on top of or underneath the first substrate. The graphic be imaged by having holes in it, e.g., by drilling through the graphic. Light emitting layers or first substrates with different images can be exchanged at any time. For example, if the light emitting layer having an image is releasably attached to the viscoelastic layer, the light emitting layer can be easily removed, and replaced by another light emitting layer having a new image.

Imaging materials may be deposited in an image-wise manner by methods such as printing or marking, e.g., by inkjet printing, laser printing, electrostatic printing and the like. Images may be monochrome such as black and white images, or they may be colored images. Images may comprise one or more colors throughout, e.g., a uniform layer of color. Images that provide a general or custom surface may be used. For example, an image may be designed such that the optical article appears as plastic, metal, wood grain, fabric, leather, non-woven, etc. The image may also comprise white dots which may be disposed on a surface or interface. The white dots may be arranged as described for extraction features of conventional solid lightguides, e.g., as described in Kinder et al. Useful imaging materials include those that reflect all or some light within a particular range of wavelengths. Useful imaging materials include those that transmit all or some light within a particular range of wavelengths. Exemplary imaging materials include colorants such as pigments and dyes. Imaging materials may also comprise photonic crystals.

Any one of first substrates shown in FIGS. 16*a-e* may comprise a polymeric film. Any one of the polymeric films may be translucent. Any one of these first substrates may be an adhesive wherein useful adhesives include optically clear adhesives, optically diffuse adhesives, radiation cured adhesives, hot melt adhesives, cold seal adhesives, heat activated adhesives, and structural adhesives having an adhesive bond strength of at least about 6 MPa, and the like. Structural adhesives are available as 3M™ SCOTCH-WELD™ Adhesives.

Any one of the optical articles shown in FIGS. 16*a-e* may comprise a clear (meth)acrylic PSA as the viscoelastic layer. Any one of the optical articles shown in FIGS. 16*a-e* may comprise a clear (meth)acrylic PSA as the viscoelastic layer and a polymeric film as the first substrate. Any one of the optical articles shown in FIGS. 16*a-e* may comprise a clear (meth)acrylic PSA as the viscoelastic layer and a translucent polymeric film as the first substrate. Any one of the optical articles shown in FIGS. 16*a-e* may comprise a clear (meth)acrylic PSA as the viscoelastic layer and an adhesive layer as the first substrate.

Any one of the optical articles shown in FIGS. 16*a-e* may comprise a second substrate disposed on the lightguide opposite the viscoelastic layer. The second substrate may comprise a reflector. For example, any one of the optical articles shown in FIGS. 16*a-e* may comprise a clear (meth)acrylic PSA as the viscoelastic layer, a translucent polymeric film as the first substrate, and a second substrate comprising a reflector. Any of the diffuse and specular reflectors described above may be used as the reflector.

Figure 17A:
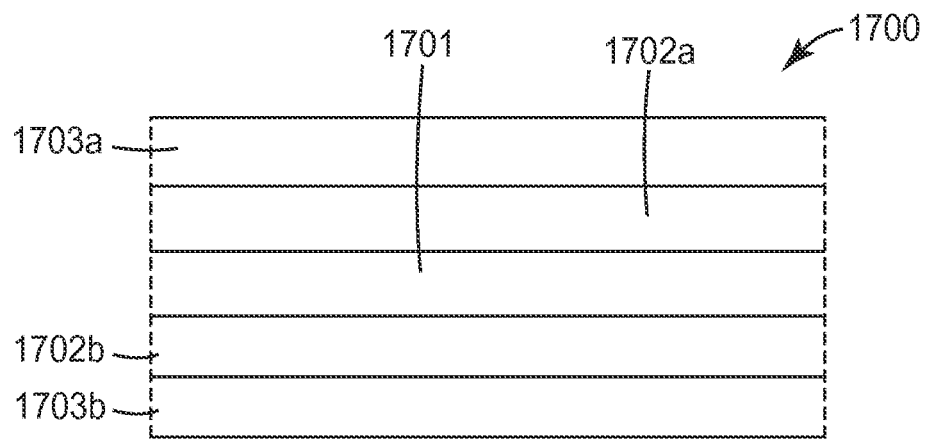
FIGS. 17a and 17b show exemplary optical articles that are double-sided.
Figure 17B:
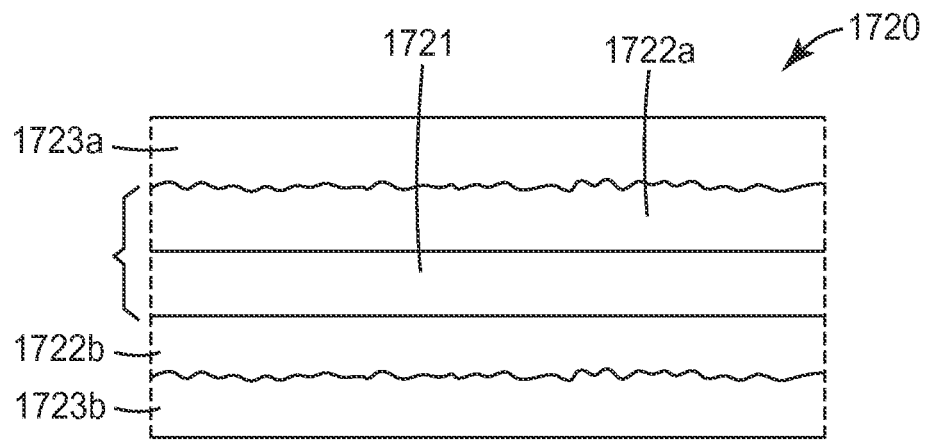

FIGS. 17*a* and 17*b* show schematic cross sections of exemplary optical articles 1700 and 1720, respectively. These optical articles are "double-sided graphics". Exemplary optical article 1700 comprises first viscoelastic layer 1702*a* disposed between lightguide 1701 and first light emitting layer 1703*a*. Second viscoelastic layer 1702*b* is disposed between lightguide 1701 and second light emitting layer 1703*b*. Any combinations of layers described herein may be used. Different layers can be used on each side of the lightguide, for example, first light emitting layer 1703*a* and second light emitting layer 1703*b* may be different. For example, light can be directed on one side and emitted on the other.

Exemplary optical article 1720 comprises first viscoelastic layer 1722*a* disposed between lightguide 1721 and first light emitting layer 1723*a*. Second viscoelastic layer 1722*b* is disposed between lightguide 1721 and second light emitting layer 1723*b*. In this embodiment, each interface between viscoelastic layer and light emitting layer has a random structure such that light extracted into each light emitting layer is diffuse. Any combinations of layers described herein may be used. Different layers can be used on each side of the lightguide, for example, first light emitting layer 1723*a* and second light emitting layer 1723*b* may be different. For example, light can be directed on one side and emitted on the other.

The optical article may comprise a lightguide disposed between first and second viscoelastic layers, wherein light emitted by the light source enters the lightguide and is transported within the lightguide by total internal reflection. This optical article may further comprise first and second substrates, wherein the first substrate is disposed on the first viscoelastic layer opposite the lightguide, and the second substrate is disposed on the second viscoelastic layer opposite the lightguide. At least about 50% of light that enters the lightguide may be extracted from the lightguide and emitted by the first and/or second substrates. Less than about 10% of light that enters the lightguide may be extracted from the lightguide. The first substrate may comprise an imaged polymeric film, and the second substrate a reflector. The first and second substrates may be release liners.

The optical articles may be made using any method or process commonly used for making multilayer constructions. Typical processes comprise those that are continuous processes such as continuous cast and cure, extrusion, microreplication, and embossing methods. Various types of radiation may be used for processes in which a material needs to be cured, e.g., crosslinked. Various types of chemistries, including those that do not require radiation, may be used for materials that need to be cured. If a layer or substrate is made from a curable material, then the material may be cured before, after or during contact with the light source. If a layer or substrate is made from a cured material, then the material may be cured before, after or during contact with other one or more layers or substrates. If a layer or substrate is made from a cured material, then the material may be cured using the light source either before, during or after they are optically coupled to the lightguide.

Conventional molding processes may also be used. Molds may be made by micro-machining and polishing of a mold material to create the desired features, structured surfaces, etc. Mold materials include polymeric, glass and metal materials. The molds may need to be suitable for making optically smooth surfaces. An optically smooth surface, if made from curable material, may be formed by simply allowing the material to cure in air or other atmosphere such that the material levels itself. Laser ablation may be used to structure a surface a layer or substrate or mold.

In some embodiments, each layer or substrate may be made separately, contacted and pressed together using finger pressure, a hand roller, an embosser or a laminator.

In some embodiments, a layer or substrate may be formed on another layer or substrate either separately or simultaneously. For example, a viscoelastic layer may be extruded simultaneously with a lightguide. Alternatively, a layer or substrate may be formed from curable materials and treated by heating and/or applying radiation, or a layer or substrate may be formed from solvent compositions and formed by removing the solvent.

In cases where the lightguide material or the viscoelastic material is curable, an optical article having a partially cured lightguide or viscoelastic layer, respectively, may be made. In cases where the lightguide material or the viscoelastic material is curable, chemically curing materials may be used such that the material is crosslinked. In cases where the lightguide material or the viscoelastic material is curable, the material may be cured before, after and/or during contact with another material or the light source.

In cases where the lightguide material or the viscoelastic material is curable using light, the light source may be optically coupled to the material and curing carried out by injecting light from the light source.

A first substrate may be used to structure a surface of the viscoelastic layer, e.g., the viscoelastic layer may not be structured by itself, rather, it becomes structured when contacted with a structured surface of a first substrate. It is also possible for the viscoelastic layer to have a structured surface such that it deforms a surface of a substrate to create a structured interface.

The optical article may be made using any suitable method including laminating, embossing, molding, casting, casting and curing, and the like. The optical article can be made using finger pressure if the viscoelastic layer comprises a PSA. The layers described herein may be made by melt-processing suitable polymers. The layers described herein may also be made by hardening or curing suitable compositions using radiation or chemical curing methods. If the viscoelastic layer is made from a radiation curable material, the optical article can be made using the pre-cured material which is subsequently cured. The radiation curable material may be cured using the light source to inject light into the light transport layer which is then extracted into the radiation curable layer.

The lightguide may be made by direct micro-machining to create the emitting feature(s) of a polymeric or glass piece. The lightguide may be made from a hardened material that has been melt processed or from a radiation-cured material. Cast and cure processes and conventional molding processes may be used. The optically smooth surface of the lightguide may also be made using any suitable machining method for polishing surfaces. The optically smooth surface of the lightguide, if made from radiation-curable materials, may be formed by simply allowing the material to cure in air or other atmosphere such that the material levels itself.

The optical articles and devices may be provided in a form that can be sold to consumers. For example, optical devices disclosed herein may be provided as lighting elements on the interior or exterior of automobiles that can be purchased by consumers. For another example, individual optical devices may be sold to consumers for some specific or general use. For another example, individual optical articles and light sources may be sold together or separately to consumers for some specific or general use. For yet another example, the optical articles and devices may be available in bulk form such as in strip, roll, or sheet form such that consumers may divide, cut, separate, etc. them into individual articles and devices.

The optical articles and optical devices disclosed herein may be provided in any number of ways. The optical articles and optical devices may be provided as sheets or strips laid flat, or they can be rolled up to form a roll. The optical articles and optical devices may be packaged as single items, or in multiples, in sets, etc. The optical articles and light sources may be provided in an assembled form, i.e., as an optical device. The optical articles and light sources may be provided as kits wherein the two are separate from each other and assembled at some point by the user. The optical articles and light sources may also be provided separately such that they can be mixed and matched according to the needs of the user. The optical articles and optical devices may be temporarily or permanently assembled to light up.

The optical articles and devices may be provided in the form of items sold to commercial manufacturers or users. For example, optical devices disclosed herein may be provided as lighting elements in instrument panel assemblies that can be purchased by automobile manufacturers or automobile repair shops. For another example, individual optical devices may be sold to automobile manufacturers or automobile repair shops for assembly or repair of some specific part of an automobile. For another example, individual optical articles and light sources may be sold together or separately to automobile manufacturers or automobile repair shops for assembly or repair of some specific part of an automobile. For yet another example, the optical articles and devices may be available in bulk form such as in strip, roll, or sheet form such that a manufacturer or other user may divide, cut, separate, etc. the form into individual articles and devices.

The optical articles disclosed herein may be altered depending on a particular use. For example, the optical articles can be cut or divided by any suitable means, e.g., using a scissors or a die cutting method. A particularly useful die cutting method is described in U.S. Provisional Ser. No. 61/046,813 (Sherman et al.) incorporated herein by reference. The optical articles and devices may be cut or divided into different shapes such as alphabetic letters; numbers; geometric shapes such as squares, rectangles, triangles, stars and the like.

The optical articles and devices may be used for reading and general functioning within enclosed living spaces. The optical articles and devices may be used for ambient lighting.

Figure 18:
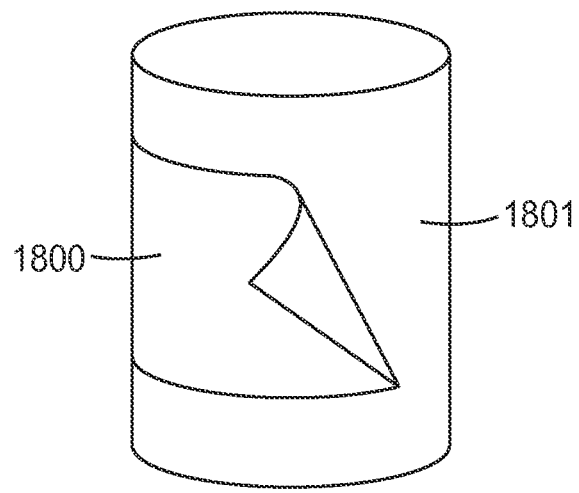
FIGS. 18-24 show exemplary applications in which the optical devices and articles can be used.

The optical articles and optical devices may be used for signage such as for graphic arts applications. The optical articles and optical devices may be used on or in windows, walls, wallpaper, wall hangings, pictures, posters, billboards, pillars, doors, floormats, vehicles, or anywhere signage is used. Signage may be single-sided or double-sided as shown in FIGS. 11 and 17a-b, respectively. FIG. 18 shows a schematic drawing of exemplary optical article or optical device 1800 in contact with an article having curved surface 1801.

Figure 19:
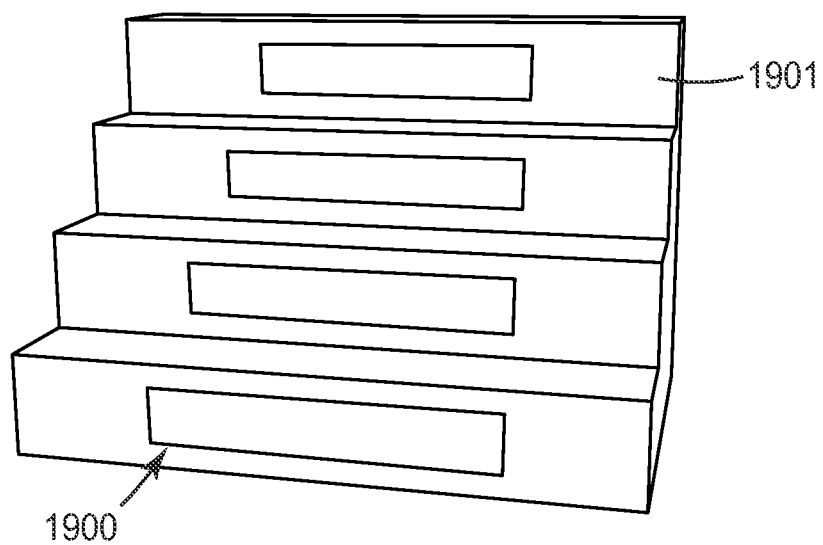

The optical articles and devices may be used for safety purposes wherever light is desired. For example, the optical articles and devices may be used to illuminate one or more steps of a ladder, steps of a stairway, aisles such as in airplanes and movie theatres, walkways, egress, handrails, work zone identification signs and markings. FIG. 19 shows a schematic drawing of exemplary optical article or optical device 1900 in contact with stairs 1901 of a stairway.

Figure 20:
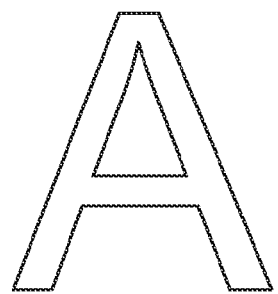

The optical articles and optical devices may be used in a variety of items such as reading lights; party and holiday decorations such as hats, ornaments, string lighting, balloons, gift bags, greeting cards, wrapping paper; desk and computer accessories such as desk mats, mousepads, notepad holders, writing instruments; sporting items such as fishing lures; craft items such as knitting needles; personal items such as toothbrushes; household and office items such as clock faces, wall plates for light switches, hooks, tools. FIG. 20 shows a schematic drawing of an exemplary cut-out article in which the optical article or optical device (not shown) is incorporated.

Figure 21:
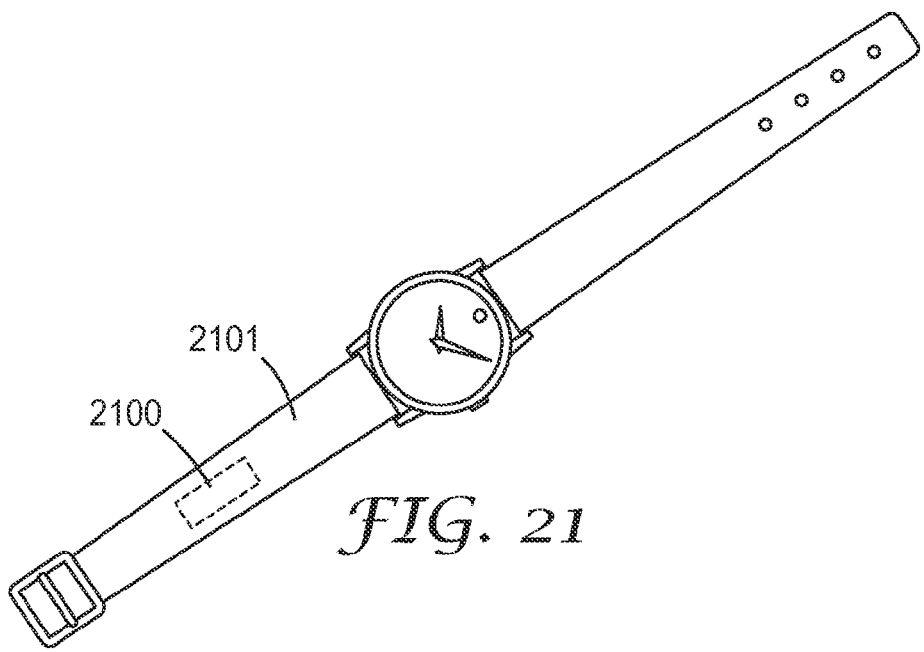

The optical articles and optical devices may be used on clothing and clothing accessories for decorative and/or safety purposes. For example, the optical articles and optical devices may be used on outerwear for cyclists, or on clothing or headgear for miners. For another example, the optical articles and optical devices may be used on or in straps and wristbands of watches, or on or in watch faces. FIG. 21 shows a schematic drawing of exemplary optical article or optical device 2100 incorporated into or on wristband 2101 of a watch.

Figure 22:
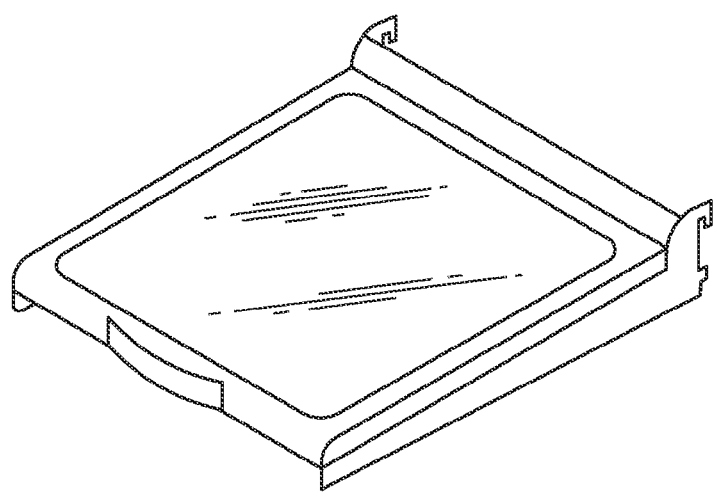

The optical articles and optical devices may be used anywhere light is needed or desired. The optical articles and optical devices may be disposed on a top surface of a shelf such that light from the article or device, respectively, is emitted in an upward direction. Likewise, the optical articles and optical devices may be disposed on a bottom surface of a shelf such that light from the article or device, respectively, is emitted in a downward direction. The optical articles and optical devices may also be disposed on or within a shelf having a light transmissive portion. The articles and devices may be arranged such that light is emitted from the light transmissive portion. FIG. 22 shows a schematic drawing of an exemplary refrigerator shelf in which the optical article or optical device (not shown) is incorporated such that light is emitted in upward and/or downward directions.

The optical articles and devices may be used as flashlights. For example, optical articles and optical devices may be disposed on the outside or inside of a battery cover plate or other part of an electronic handheld device. The optical articles and optical devices may or may not be hardwired to the electronic device's battery but could have its own power source. The electronic device's battery cover may or may not be removable from the rest of the device comprising the display.

The optical articles and optical devices may be used for vehicles such as automobiles, marine vehicles, buses, trucks, railcars, trailers, aircraft, and aerospace vehicles. The optical articles and devices may be used on almost any surface of a vehicle including the exterior, interior, or any in-between surface. For example, the optical articles and devices may be used to light up door handles on the exterior and/or interior of a vehicle. The optical articles and devices may be used to illuminate trunk compartments, for example, they may be positioned on the underside of the trunk lid or inside the compartment. The optical articles and devices may be used on bumpers, spoilers, floor boards, windows, on or as tail lights, sill plate lights, puddle lights, emergency flashers, center high mounted stop lights, or side lights and markers. The optical articles and devices may be used to illuminate the inside of engine compartments, for example, they may be positioned on the underside of the hood, inside the compartment, or on an engine part.

Figure 23:
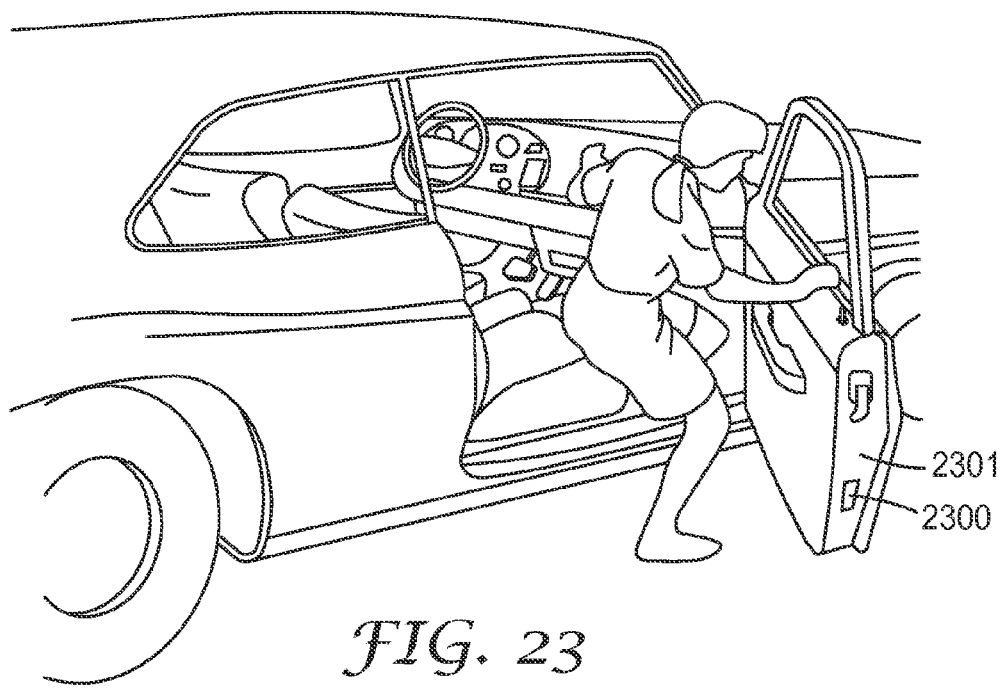

The optical articles and devices may also be used on the edge surfaces of vehicular doors between the exterior and interior panels of the doors. These optical articles and devices may be used to provide a variety of information for the user, manufacturer, etc. The optical articles and devices may be used to illuminate the instrument panel of a vehicle where lighted areas are typically displayed. The optical articles and devices may be used on other interior items such as cupholders, consoles, handles, seats, doors, dashboards, headrests, steering wheels, wheels, portable lights, compasses, and the like. The optical articles and devices may be used on back or pass areas for reading light or to provide ambient lighting for inside a vehicle. FIG. 23 shows an exemplary automobile and exemplary optical article or optical device 2300. The optical article or device is disposed on edge surface 2301 of the passenger door.

Figure 24:
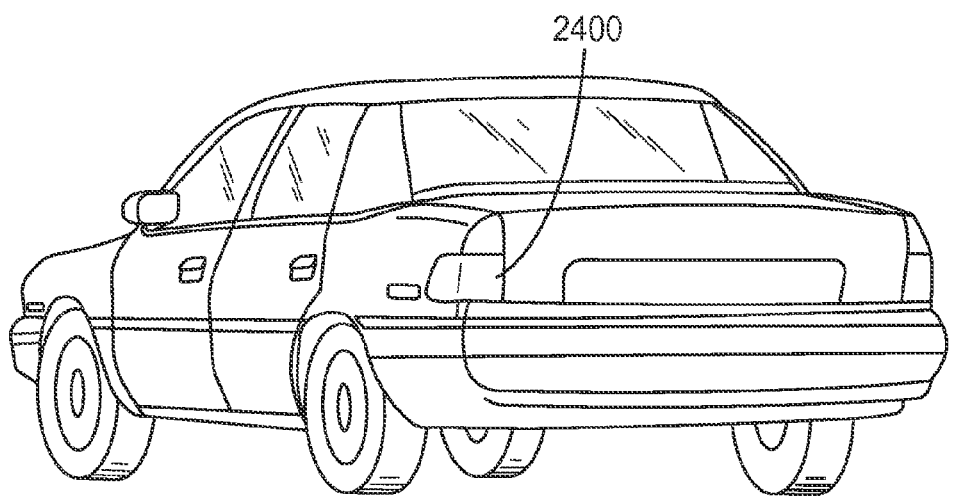

The optical articles and optical devices may be used in the manufacture of an item or as a replacement part of an item. For example, the optical articles and optical devices may be sold to an automobile manufacturer or automobile repair shop for assembly or repair of some specific part of an automobile. FIG. 24 shows an exemplary automobile having tail light 2400. An optical article or optical device (not shown) is disposed behind the outside layer of the tail light which is typically red, yellow or clear plastic. The tail light may comprise a cavity with a light bulb or LED as a light source. An optical article or device may be used in the cavity as a replacement for the light source. Alternatively, the tail light may not comprise a cavity or at least comprise a much smaller cavity than is used in today's automobiles. An optical article or optical device may be disposed behind or within the outside layer of the tail light such that the overall size of the tail light is reduced.

The optical articles and optical devices may be used for traffic safety such as for traffic signs, street signs, highway dividers and barriers, toll booths, pavement markings, and work zone identification signs and markings. The optical articles and devices may be used on license plates for decoration, to provide information such as vehicle registration, etc. The optical articles and devices may also be used to provide light near license plates such that the license plates are lit up from the side, top, etc.

The optical articles and optical devices may be used with illumination devices comprising hollow light recycling cavities sometimes referred to as backlight assemblies or sign boxes. Backlight assemblies may be used for signage or general lighting. Exemplary backlight assemblies are disclosed in WO 2006/125174 (Hoffman et al.) and US 2008/0074901 (David et al.) all incorporated herein by reference. The optical articles and optical devices disclosed herein may be used to replace the light sources described in these references.

The optical articles and optical devices may be used on or in display devices such as cell phones, personal digital devices, MP3 players, digital picture frames, monitors, laptop computers, projectors such as mini-projectors, global positioning displays, televisions, etc. The optical articles may be used in place of conventional lightguides used to backlight a display panel of the display device. For example, the viscoelastic layer may be used to replace a solid or hollow lightguide that distributes light from one or more substantially linear or point light sources. The display device can be assembled without the need for adhesives to bond display components to the viscoelastic layer. Exemplary display devices include those having LCD and plasma display panels. Exemplary display devices are described in US 2008/232135 A1 (Kinder et al.) and U.S. Pat. No. 6,111,696 (Allen et al.)

The optical articles and devices may be used for lighting buttons and keypads in various electronic devices including the display devices described above. In this case, the optical articles and devices are used in place of a conventional lightguide as described in U.S. Pat. No. 7,498,535 (Hoyle); U.S. 2007/0279391 A1 (Marttila, et al.), U.S. 2008/0053800 A1 (Hoyle), and U.S. Ser. No. 12/199,862 (Sahlin, et al.) all incorporated herein by reference.

The optical articles and devices disclosed herein may be used with retroreflective sheeting. Optical articles and devices used with retroreflective sheeting may be used in or on a variety of articles, e.g., road signs, street signs, cones, posts, barricades, guardrails, license plates, pavement markers, marking tape for work zone identification, linear delineation panels for concrete barriers and metal guardrails, shipboard markers (waterlines, pipes, etc.); on exterior, interior, or any in-between surfaces of vehicles as described herein. Retroreflective articles comprising the optical articles and devices disclosed herein may be provided in any of the forms described herein.

The optical articles and optical devices disclosed herein may be incorporated into security films or laminates. These security laminates are used to protect documents or packages to ensure that underlying items are not altered. Security laminates may be used to make driver licenses, passports, tamper proof seals and the like. Exemplary security film constructions are described in U.S. Pat. No. 5,510,171 (Faykish); U.S. Pat. No. 6,288,842 (Florczak et al.); and U.S. Ser. No. 12/257,223 (Endle et al.) all incorporated herein by reference.

The optical articles and optical devices may be used in the construction of an illuminated license plate. Useful optical articles include the front lit and back lit optical articles described in U.S. 2007/0006493 (Eberwein); U.S. 2007/0031641 A1 (Frisch et al.); U.S. 20070209244 (Prollius et al.); WO 2008/076612 A1 (Eberwein); WO 2008/121475 A1 (Frisch); WO 2008/016978 (Wollner et al.) and WO 2007/92152 A2 (Eberwein); all incorporated herein by reference. In these constructions, the lightguide is the lightguide and the viscoelastic layer may be disposed on either side the lightguide.

The optical articles and devices described herein may be used for creating three-dimensional (3D) images in displays, buttons, keypads and the like. For example, 3D automotive displays and security laminates may be made. The optical articles and devices may be used with microlens sheeting in which a composite image floats above or below the sheeting, or both. For example, the optical articles and devices may be used with microlens sheetings described in U.S. Pat. No. 7,336,422 B2 (Dunn et al.), U.S. 2008/0130126 A1 (Brooks et al.), U.S. 2007/0081254 A1 (Endle et al.), U.S. 2007/0279391 A1 (Martina et al.), and U.S. Application Ser. No. 61/078,971 filed on Jul. 8, 2008 (Gates et al.), U.S. Pat. No. 6,288,842 (Florczak et al.); and U.S. Ser. No. 12/257,223 (Endle et al.) incorporated herein by reference.

The optical articles and devices may comprise an electrical circuit. For example, the first substrate may comprise an electrical circuit. The first substrate may also comprise a reflector which comprises an electrical circuit. The first substrate may also comprise a mirror which comprises an electrical circuit. The light source may be in electrical communication with the electrical circuit. The light source may comprise an array of multiple light sources. The viscoelastic layer can be formed onto the electrical circuit such that the light sources inject light into the viscoelastic layer throughout the entire area of the layer.
US 2008/0062688 (Aeling et al.);

The optical articles and devices may be used in sensing/detecting devices wherein a sensor is disposed to receive light emitted from the viscoelastic layer. Also disclosed is a sensing/detecting device in which the light source is replaced with a sensor/detector. The sensor/detector can be a photodetector, a silicon photodiode, an IR detector, a solar cell, or an optoelectronic device, or some combination thereof.

The optical articles and devices may be incorporated into a therapeutic device. For example, the optical articles and devices disclosed herein may be used in conformal patches for providing light therapy to tissue. Exemplary conformal patches are described in U.S. Pat. No. 6,096,066 (Chen et al.), incorporated herein by reference. Additional therapeutic devices are described in U.S. 2005/0070976 A1 (Samuel et al.); Electronics World, October 2007; and LEDs Magazine, November 2006; all of which are incorporated herein by reference.

The terms "in contact" and "disposed on" are used generally to describe that two items are adjacent one another such that the whole item can function as desired. This may mean that additional materials can be present between the adjacent items, as long as the item can function as desired.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| PDMS Diamine | α,ω-bis(aminopropyl) polydimethylsiloxane having a molecular weight of about 33,000 g/mole and prepared as described in Example 2 of U.S. Pat. No. 5,461,134 |
| MQ Resin | a 60% solids solution of MQ silicone resin in toluene, commercially available from GE Silicones; Waterford, NY under the trade designation "SR-545" |
| Polyamine | an organic diamine, commercially available from DuPont, Wilmington, DE under the trade designation "DYTEK A" |
| H12MDI | methylenedicyclohexylene-4,4'-diisocyanate, commercially available from Bayer, Pittsburgh, PA under the trade designation "DESMODUR W" |

Example A

Example 1

A silicone urea PSA with an elastomer was prepared by placing 14.86 parts PDMS Diamine-1 in a glass reactor with 0.05 parts Polyamine-1, 39.00 parts toluene and 21.00 parts 2-propanol. To this solution was added 0.23 parts H12MDI. The mixture was stirred at room temperature for two hours and became viscous. To this was added 25.00 parts of MQ Resin-1. The resulting silicone urea PSA contained a molar ratio of PDMS Diamine-1/Polyamine-1/H12MDI of 1/1/2 and was formulated with 50 weight % MQ Resin-1.

The silicone urea PSA was coated on a PET release liner (LOPAREX 5100 from Loparex LLC) to form a PSA layer having a dry thickness of about 25 um. The refractive index of the silicone urea PSA layer was about 1.40.

A laminate was prepared using a tape (VHB™ Acrylic Tape 4910F from 3M Company) comprising a clear acrylic PSA (nominal thickness 1 mm) disposed on a liner (0.13 mm). The refractive index of the acrylic PSA layer was 1.473 as measured using an Abbe refractometer. The silicone urea PSA layer was laminated to the acrylic PSA layer using a hand roller. The tape liner was removed and a second silicone urea PSA layer was laminated to the newly exposed side of the acrylic PSA layer. The PET release liners on the silicone urea PSA layers were removed.

An LED light source was pressed into the edge of the acrylic PSA layer of a 4×4 in. sample of the laminate such that the LED was approximately perpendicular to the width of the laminate and parallel to the length. The LED was activated.

Light propagated through the acrylic PSA layer and was observed to exit the layer by holding a piece of paper along the edge opposite the edge where the LED was in contact with the layer. Light did not appear to exit the laminate in any other direction.

Example 2a

A laminate was prepared as described for Example 1 except that one of the silicone urea PSA layers was replaced with a multilayer polymeric mirror film (Vikuiti™ ESR from 3M Co.). An LED light source was pressed into the edge of the acrylic PSA layer of a 4×4 in. sample of the laminate such that the LED was approximately perpendicular to the width of the laminate and parallel to the length. The LED was activated. Light propagated through the acrylic PSA layer and was observed to exit the layer by holding a piece of paper along the edge opposite the edge where the LED was in contact with the layer. Light did not appear to exit the laminate in any other direction.

Example 2b

An acrylic extractor film having microstructured features was obtained. This film is described in detail in US 2005/0052750 A1 (King et al.) incorporated herein by reference. One major surface of the acrylic extractor film comprised saw-tooth or pyramidal prismatic features. The opposing major surface of the film comprised cylindrical lenses. The refractive index of the acrylic extractor film was from about 1.52 to about 1.56.

A laminate was prepared as described for Example 1 except that one of the silicone urea PSA layers was replaced with a multilayer polymeric mirror film (Vikuiti™ ESR from 3M Co.). The acrylic extractor film was pressed into the silicone urea PSA layer such that the pyramidal prismatic features were in contact with the acrylic PSA layer. The LED was activated. The acrylic extractor film was immediately lit with light from the acrylic PSA layer.

Attachment of additional multilayer polymeric mirror films to the cut edges of the laminate was accomplished using finger pressure.

Example B

Comparative Example

A transfer tape (3M™ Optically Clear Laminating Adhesive 8187 from 3M Company) comprising an optically clear acrylic PSA (175 um thickness) disposed between 2 PET liners (each 50 um thickness) was used. The refractive index of the optically clear acrylic PSA layer was 1.47. Laminates were prepared by laminating two glass slides to each other using two layers of the 8187 PSA (350 um total thickness). The glass slides were 75×38×1 mm and No. 2956 from Esco Products Inc.

A small extension of the PSA, creating a tacky tab, ~⅛"× ¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was breaking and could not be removed from the glass using the system and method described in commonly assigned U.S. Provisional Ser. No. 61/036,683 (Johnson et al.) filed on Mar. 14, 2008 and incorporated herein by reference. The whole PSA layer remained as residue on both pieces of glass.

Example 3

The silicone urea PSA layer was laminated to the 8187 PSA layer using a hand roller. The tape liner was removed and a second silicone urea PSA layer was laminated to the newly exposed side of the 8187 PSA layer. The PET release liners on the silicone urea PSA layers were removed. Laminates were prepared by laminating two glass slides described above to each other using the three layer PSA.

An LED light source was pressed into the edge of the 8187 PSA layer of a laminate such that the LED was approximately perpendicular to the width of the laminate and parallel to the length. The LED was activated. Light propagated through the 8187 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"× ¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example 4

A transfer tape (3M™ Optically Clear Laminating Adhesive 8142 from 3M Company) comprising an optically clear acrylic PSA (50 um thickness) disposed between 2 PET liners (each 50 um thickness) was used. The refractive index of the acrylic 8142 PSA layer was 1.47.

The silicone urea PSA layer was laminated to the 8142 PSA layer using a hand roller. The tape liner was removed and a second silicone urea PSA layer was laminated to the newly exposed side of the 8142 PSA layer. The PET release liners on the silicone urea PSA layers were removed. Laminates were prepared by laminating two glass slides described above to each other using the three layer PSA.

An LED light source was pressed into the edge of the 8142 PSA layer of a laminate such that the LED was approximately perpendicular to the width of the laminate and parallel to the length. The LED was activated. Light propagated through the 8142 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"× ¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example 5

A transfer tape (3M™ Optically Clear Laminating Adhesive 8141 from 3M Company) comprising an optically clear acrylic PSA (25 um thickness) disposed between 2 PET liners (each 50 um thickness) was used. The refractive index of the acrylic 8142 PSA layer was 1.47.

The silicone urea PSA layer was laminated to the 8141 PSA layer using a hand roller. The tape liner was removed and a second silicone urea PSA layer was laminated to the newly exposed side of the 8141 PSA layer. The PET release liners on the silicone urea PSA layers were removed. Laminates were prepared by laminating two glass slides described above to each other using the three layer PSA.

An LED light source was pressed into the edge of the 8141 PSA layer of a laminate such that the LED was approximately perpendicular to the width of the laminate and parallel to the length. The LED was activated. Light propagated through the 8141 PSA layer and was observed to exit the layer by holding a piece of paper along the edge opposite the edge where the LED was in contact with the layer. Light did not appear to exit the laminate in any other direction.

A small extension of the PSA, creating a tacky tab, ~⅛"×¼", was left exposed. After some time had passed, attempts were made to separate the glass slides and to remove adhesive from the slides after separation. The glass slides were not removable by shearing or peeling forces. The tab was slowly pulled at ~0° angle to the surfaces of the glass and stretched to debond the two pieces of glass. The PSA layer was removed from the glass using the system and method described in Johnson et al.

Example C

Example 6

A 3-layer laminate was prepared from 3 pieces of tape (VHB™ Acrylic Tape 4910F from 3M Company) comprising a clear acrylic PSA having a nominal thickness 1 mm and a refractive index of 1.473 as measured using an Abbe refractometer. A hand roller was used to prepare the 3-layer laminate. This 3-layer laminate was then laminated to the face surface (viewer's side) of 3M™ Diamond Grade™ Reflective Sheeting from 3M™ Company (4"×8" area) so that the sheeting was front lit. A side-emitting LED was pressed into the core PSA from one end and light was easily passed through the entire 8 inches of the 3-layer laminate and was able to be visibly seen exiting. Light was also extracted perpendicular to the light source along the white hexagon seal pattern of the sheeting.

Example 7

A 3-layer laminate was prepared from 3 pieces of tape (VHB™ Acrylic Tape 4910F from 3M Company) comprising a clear acrylic PSA having a nominal thickness 1 mm and a refractive index of 1.473 as measured using an Abbe refractometer. A hand roller was used to prepare the 3-layer laminate. A 93/7 w/w isooctylacrylate/acrylamide solvent based adhesive was loaded with 2 and 10 pph hollow glass spheres having a mean diameter of about 18 micron (SPHERICEL Grade 60P18 from Potters Industries Inc.) and coated to a dry thickness of 0.5 mil (13 micron). The PSA handspread loaded with 2 pph hollow glass spheres was cut into three inch wide strips. These strips were laminated to a polymeric mirror film as described in Example 2, so that they formed a square. The PSA handspread loaded with 10 pph hollow glass spheres was laminated to fill the square.

On top of the adhesive matrix with hollow glass spheres was laminated the 3 mm thick VHB sample. The silicone urea PSA layer described in Example 1 was hand laminated on top of the VHB adhesive. A translucent graphic film was placed on top of the silicone PSA layer. Side-emitting LED lights were injected into the lightguide (VHB layer) from two opposing sides of the square, and light was extracted through the silicone urea PSA layer and into the translucent graphic film.

Example 8

An adhesive comprising 85/14/1 by weight of isooctyl acrylate/isobornyl acrylate/acrylic acid, 0.08 wt. % 1-6-hexanediol diacrylate and 0.20 wt. % IRGACURE 651 (Ciba Specialty) was coated onto a polymeric mirror film as described in Example 2, using a notched bar knife coater. The adhesive was coated with a wet thickness of 50 mils (1250 um) on one side and 40 mils (1000 um) on the other to give a slight wedge. The adhesive coating was covered with a silicone release liner (CP Films T10 2.0 mil polyester release liner) and cured using a low intensity UV lamp for 15 minutes. The adhesive had a refractive index of 1.474 as measured on an Abbe refractometer. A translucent graphic film was then laminated to the adhesive layer opposite the polymeric mirror film (8"×10" area). A side-emitting LED circuit was pressed into the cured PSA layer and light was easily passed through the entire 10 inches of PSA length and was able to be visibly seen exiting. Light was also extracted perpendicular to the light source and into the translucent graphic.

Example D

Example 9

A flexible acrylic lightguide (0.5 mm thick) designed to extract light in a cellular phone keypad was obtained. The lightguide material is described in US 2007/0191506 A1 (Rajan) and comprised a methacrylate functionalized acrylate oligomer and a polyalkyleneglycol dimethacrylate. A silicone urea PSA layer as described in Example 1 was hand laminated to both top and bottom surfaces of the flexible acrylic lightguide material. A simple side-emitting LED light was injected into the lightguide, and light was extracted along the extraction pattern through the silicone PSA cladding. Light was guided between the cladding and the lightguide, and did not leak through the cladding at any point other than the intended extraction points.

Example E

Example 10

An adhesive composition formulated with 90/10 isooctyl acrylate/acrylic acid, 0.3 wt % hexanediol diacrylate and 0.2 wt % IRGACURE 651 photoinitiator (Ciba Specialty) was coated onto a mirror film which had 2 ribbons of side-emitting light emitting diodes (LEDs) attached 9 inches apart (with double stick adhesive). The adhesive composition was coated using a notched bar knife coater and covered with a silicone release liner (CP Films T10 2.0 mil polyester release liner). The adhesive composition was cured using a low intensity UV lamp for 15 minutes. The adhesive composition was coated at a wet thickness of 70 mils to completely encapsulate the LED ribbons. The adhesive had a refractive index of 1.474 (as measured on an Abbe refractometer). The adhesive was removed from the ribbons at a connection point so that the LEDs could be powered. An extractor layer having an extractor pattern of dots printed on a clear 5 mil PET was laminated to the lightguide (9"×9" area) with the embedded LED ribbons. A diffuse layer of white PET film was then placed on top of the extractor layer, and finally a vinyl graphic film was placed on top of this (image printed on vinyl film). The encapsulated side emitting LEDs were powered and light was easily passed through the entire 9 inches of PSA length and was able to be visibly seen exiting via the extraction pattern through the vinyl graphic film.

What is claimed is:

1. An optical device comprising a light source and an optical article, the optical article comprising a lightguide and a viscoelastic cladding layer, wherein the viscoelastic cladding layer comprises a pressure sensitive adhesive, wherein the viscoelastic cladding layer has an index of refraction lower by about 0.2 than an index of refraction of the lightguide and wherein the viscoelastic cladding layer is disposed on the lightguide, and wherein light emitted by the light source enters the lightguide and is reflected at at least a portion of an interface between the lightguide and the viscoelastic cladding layer; and wherein the interface between the lightguide and the viscoelastic cladding layer comprises a plurality of features oriented to extract light being transported within the lightguide.

2. The optical device of claim 1, wherein the viscoelastic cladding layer comprises first and second regions, wherein at least about 50% of light that enters the lightguide is extracted from the lightguide and into the first region, and less than about 10% of light that enters the lightguide is extracted from the lightguide and into the second region.

3. The optical device of claim 1, wherein the lightguide comprises a polymeric material or glass.

4. The optical device of claim 1, wherein the viscoelastic cladding layer comprises a silicone pressure sensitive adhesive.

5. The optical device of claim 1, wherein the viscoelastic cladding layer comprises a stretch releasable pressure sensitive adhesive.

6. The optical device of claim 1, wherein the viscoelastic cladding layer comprises a (meth)acrylate, rubber, silicone, urethane, or a combination thereof.

7. The optical device of claim 1, wherein the viscoelastic cladding layer comprises first and second regions having different refractive indices.

8. The optical device of claim 1, wherein the optical article has a light transmittance of from about 90 to about 100% and a haze value of from about 0.01 to less than about 5%.

9. The optical device of claim 1, the optical article further comprising a first substrate disposed on the viscoelastic cladding layer opposite the lightguide, wherein the first substrate comprises a polymer, metal, glass, ceramic, release liner, a graphic, paper, fabric, grease, antiseptic gel, or a combination thereof.

10. The optical device of claim 9, wherein the first substrate emits light extracted from the viscoelastic cladding layer.

11. The optical device of claim 10, wherein at least about 50% of light extracted from the viscoelastic cladding layer is emitted from the first substrate.

12. The optical device of claim 10, wherein a surface of the first substrate comprises a plurality of features oriented to emit light from the first substrate.

13. The optical device of claim 10, wherein the first substrate comprises an imaged polymeric film.

14. The optical device of claim 10, wherein light is emitted uniformly from the first substrate.

15. The optical device of claim 10, wherein light is emitted in one or more predetermined directions from the first substrate.

16. The optical device of claim 10, wherein light is emitted at different intensities from the first substrate.

17. The optical device of claim 9, wherein the first substrate does not emit light.

18. The optical device of claim 1, the optical article further comprising a first substrate disposed on the viscoelastic cladding layer opposite the lightguide, wherein the first substrate comprises a multilayer optical film, a reflector, a mirror, a polarizer, a prismatic film, a three-quarter polarizer, a retroreflective film or a combination thereof.

19. The optical device of claim 1, the optical article further comprising a third substrate disposed on the lightguide opposite the viscoelastic cladding layer, wherein the third substrate comprises a multilayer optical film, a reflector, a mirror, a polarizer, a prismatic film, a three-quarter polarizer, a retroreflective film, polymer, metal, glass, ceramic, a graphic, paper, fabric or a combination thereof.

20. The optical device of claim 19, wherein the third substrate emits light extracted from the lightguide.

21. The optical device of claim 19, wherein the third substrate comprises an imaged polymeric film.

22. The optical device of claim 19, wherein light is emitted uniformly from the third substrate.

23. The optical device of claim 19, wherein light is emitted in one or more predetermined directions from the third substrate.

24. The optical device of claim 19, wherein light is emitted at different intensities from the third substrate.

25. A sign or marking comprising the optical device of claim 1.

26. A display device comprising a display panel and the optical device of claim 1.

27. A keypad assembly comprising one or more keys and the optical device of claim 1.

28. A tail light assembly suitable for use with a vehicle, the tail light assembly comprising a housing, a transparent cover and the optical device of claim 1.

29. An illumination device comprising a housing and the optical device of claim 1.

* * * * *